United States Patent
Xu et al.

(10) Patent No.: US 12,376,075 B2
(45) Date of Patent: Jul. 29, 2025

(54) PAGING EARLY INDICATION TECHNIQUES

(71) Applicant: QUALCOMM Incorporated, San Diego, CA (US)

(72) Inventors: Huilin Xu, Temecula, CA (US); Peng Cheng, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/046,805

(22) Filed: Oct. 14, 2022

(65) Prior Publication Data
US 2023/0081672 A1 Mar. 16, 2023

Related U.S. Application Data

(63) Continuation of application No. PCT/CN2021/071645, filed on Jan. 14, 2021.

(51) Int. Cl.
*H04W 68/02* (2009.01)
*H04W 56/00* (2009.01)
(Continued)

(52) U.S. Cl.
CPC ....... *H04W 68/025* (2013.01); *H04W 56/001* (2013.01); *H04W 68/005* (2013.01); *H04W 68/02* (2013.01); *H04W 72/23* (2023.01)

(58) Field of Classification Search
CPC . H04W 68/025; H04W 68/005; H04W 72/23; H04W 56/001; H04W 68/02;
(Continued)

(56) References Cited

U.S. PATENT DOCUMENTS

| 9,210,686 B2 | 12/2015 | Takano |
| 2012/0122495 A1* | 5/2012 | Weng ................ H04W 68/025 455/458 |

(Continued)

FOREIGN PATENT DOCUMENTS

JP 2023537659 A 9/2023

OTHER PUBLICATIONS

CMCC: "Discussion on Paging Enhancement", 3GPP Draft, R1-2008021, 3GPP TSG RAN WG1 #103-e, 3rd Generation Partnership Project (3GPP), Mobile Competence Centre, 650, Route Des Lucioles, F-06921 Sophia-Antipolis Cedex, France, vol. Ran WG1, No. e-Meeting, Oct. 26, 2020-Nov. 13, 2020, Oct. 23, 2020 (Oct. 23, 2020), XP051945314, 8 Pages, p. 3-p. 5.

(Continued)

*Primary Examiner* — Michael Y Mapa
(74) *Attorney, Agent, or Firm* — Patterson + Sheridan, L.L.P.

(57) ABSTRACT

Certain aspects of the present disclosure provide techniques for paging based on a paging early indication (PEI). Particular aspects provide for a method for wireless communication performed by a user equipment (UE). The method generally includes determining a set of paging cycles for receiving paging information from a base station (BS), receiving a first paging early indicator (PEI) from the BS in a first paging cycle of the set of paging cycles, wherein the first PEI indicates whether the paging information will be transmitted to the UE in one or more second paging cycles of the set of paging cycles occurring after the first paging cycle, and receiving the paging information in the one or more second paging cycles based on the first PEI received in the first paging cycle.

17 Claims, 16 Drawing Sheets

(51) Int. Cl.
*H04W 68/00* (2009.01)
*H04W 72/23* (2023.01)

(58) Field of Classification Search
CPC .... H04W 56/00; H04W 76/30; H04L 5/0007; H04L 5/0048; Y02D 30/70
USPC ..................................... 455/458, 426.1, 515
See application file for complete search history.

(56) References Cited

U.S. PATENT DOCUMENTS

| | | | | |
|---|---|---|---|---|
| 2014/0248915 | A1* | 9/2014 | Chandramouli | H04W 84/027 455/458 |
| 2019/0239189 | A1* | 8/2019 | Hwang | H04W 52/0216 |
| 2019/0254110 | A1 | 8/2019 | He et al. | |
| 2022/0046585 | A1* | 2/2022 | Wu | H04L 5/0053 |
| 2022/0124674 | A1* | 4/2022 | Babaei | H04W 68/02 |
| 2022/0303894 | A1* | 9/2022 | Höglund | H04W 52/0219 |
| 2022/0369283 | A1* | 11/2022 | Ma | H04W 68/02 |
| 2023/0043139 | A1* | 2/2023 | Hwang | H04W 72/23 |
| 2023/0075197 | A1 | 3/2023 | Xu et al. | |
| 2024/0049176 | A1 | 2/2024 | Xu et al. | |
| 2024/0064699 | A1* | 2/2024 | Fu | H04W 68/00 |

OTHER PUBLICATIONS

Interdigital, Inc: "Paging Enhancements for UE Power Saving", 3GPP Draft, R1-2008689, 3rd Generation Partnership Project (3GPP), Mobile Competence Centre, 650, Route Des Lucioles, F-06921 Sophia-Antipolis Cedex, France, vol. Ran WG1, No. e-Meeting, Oct. 25, 2020-Nov. 13, 2020, Oct. 24, 2020 (Oct. 24, 2020-), XP051946695, 10 Pages, 3GPP TSG RAN WG1 #103-e, p. 4-p. 6.

International Search Report and Written Opinion—PCT/CN2021/071645—ISA/EPO—Jun. 23, 2021.

Moderator (Mediatek): "Summary for Potential Paging Enhancements", 3GPP Draft, R1-2009753, 3GPP TSG RAN WG1 e-Meeting #103, 3rd Generation Partnership Project (3GPP), Mobile Competence Centre, 650, Route Des Lucioles, F-06921 Sophia-Antipolis Cedex, France, vol. Ran WG1, Ran WG1, No. e-Meeting, Oct. 26, 2020-Nov. 13, 2020, Nov. 19, 2020 (Nov. 19, 2020), XP051955954, 88 Pages, p. 50-p. 51.

Qualcomm Incorporated: "Paging Enhancements and Evaluation Methodology", 3GPP Draft, R1-2009266, 3GPP TSG-RAN WG1 #103-e, 3rd Generation Partnership Project (3GPP), Mobile Competence Centre, 650, Route Des Lucioles, F-06921 Sophia-Antipolis Cedex, France, vol. Ran WG1, No. e-Meeting, Oct. 26, 2020-Nov. 13, 2020, Oct. 24, 2020 (Oct. 24, 2020), XP051946929, pp. 1-11, p. 7-p. 8.

VIVO: "Paging Enhancements for Idle/Inactive Mode UE Power Saving", 3GPP Draft, R1-2007673, 3GPP TSG RAN WG1#103-e, 3rd Generation Partnership Project (3GPP), Mobile Competence Centre, 650, Route Des Lucioles, F-06921 Sophia-Antipolis Cedex, France, vol. Ran WG1, No. e-Meeting, Oct. 26, 2020-Nov. 13, 2020, Oct. 24, 2020 (Oct. 24, 2020), XP051946470, 14 Pages, p. 3p. 5p. 9-p. 11.

Xiaomi Communications: "Discussion on Paging Enhancement", 3GPP Draft, R2-2008952, 3GPP TSG-RAN. WG2 Meeting #112e, 3rd Generation Partnership Project (3GPP), Mobile Competence Centre, 650, Route Des Lucioles, F-06921 Sophia-Antipolis Cedex, France, vol. Ran WG2, no. Online, Nov. 2, 2020-Nov. 13, 2020, Oct. 23, 2020 (Oct. 23, 2020), XP051942002, 7 Pages, p. 1-p. 2.

Qualcomm Incorporated: "Paging Enhancements and Evaluation Methodology", 3GPP TSG-RAN WG1 #103-e, R1-2009266, No. e-Meeting, Oct. 26, 2020-Nov. 13, 2020, pp. 1-11.

* cited by examiner

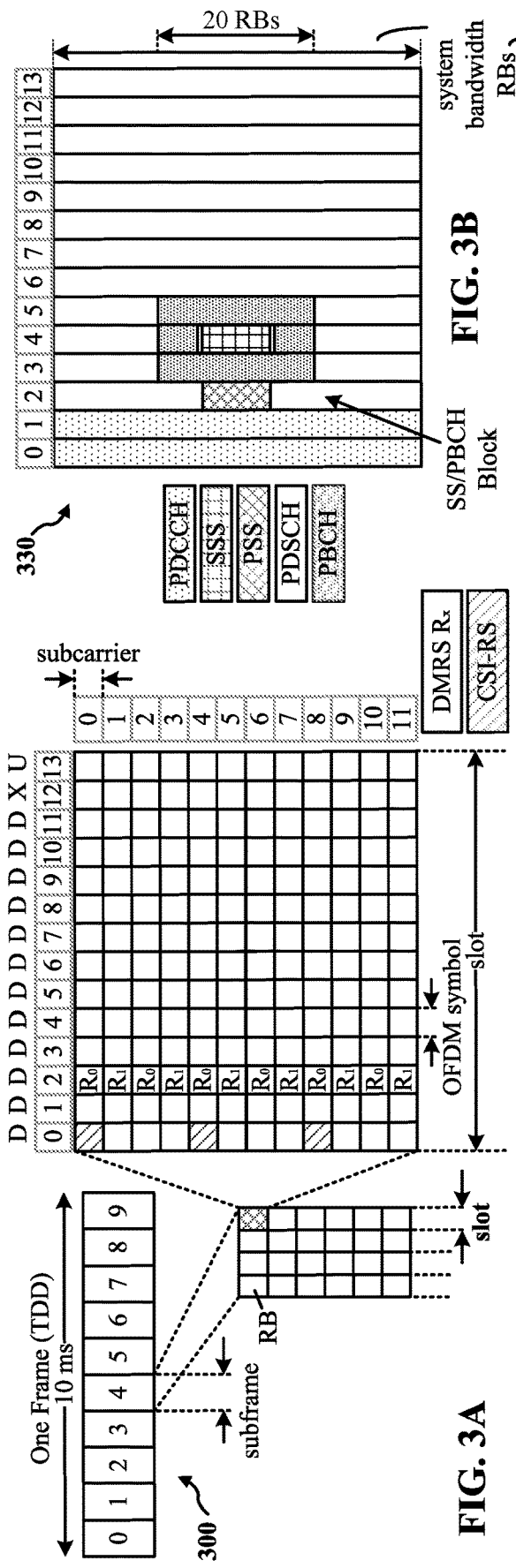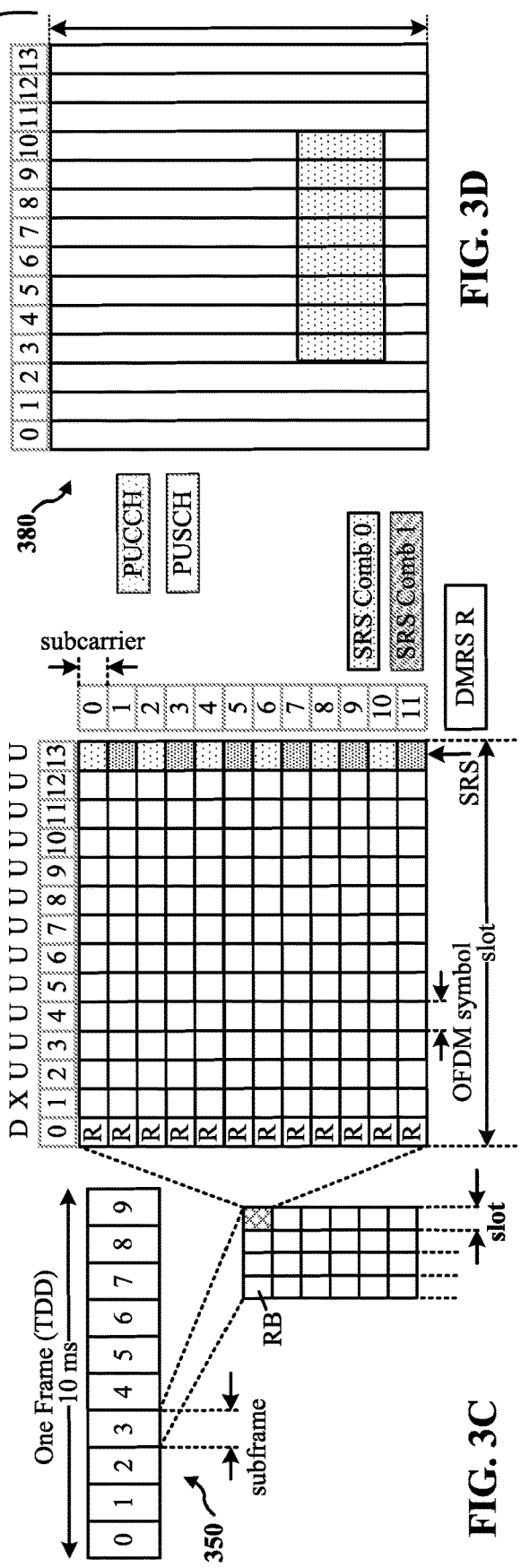

PAGING EARLY INDICATION TECHNIQUES

CROSS-REFERENCE TO RELATED APPLICATIONS

This application is a continuation of PCT Application No. PCT/CN2021/071645, filed Jan. 14, 2021, which is hereby assigned to the assignee hereof and hereby expressly incorporated by reference herein in its entirety as if fully set forth below and for all applicable purposes.

BACKGROUND

Aspects of the present disclosure relate to wireless communications, and more particularly, to techniques for paging early indication (PEI) in wireless communication systems.

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, such challenges may include challenges in paging and power consumption associated with certain wireless devices. Consequently, there exists a need for further improvements in wireless communications systems to overcome various challenges.

SUMMARY

Certain aspects can be implemented in a method for wireless communication performed by a user equipment (UE). The method generally includes determining a set of paging cycles for receiving paging information from a base station (BS), receiving a first paging early indicator (PEI) from the BS in a first paging cycle of the set of paging cycles, wherein the first PEI indicates whether the paging information will be transmitted to the UE in one or more second paging cycles of the set of paging cycles occurring after the first paging cycle, and receiving the paging information in the one or more second paging cycles based on the first PEI received in the first paging cycle.

Certain aspects can be implemented in a method for wireless communication performed by a user equipment (UE). The method generally includes determining a set of paging cycles for receiving paging information from a base station (BS), receiving a paging early indicator (PEI) from the BS, wherein the PEI includes: an indication to the UE whether the paging information will be transmitted in one or more paging cycles of the set of paging cycles and additional information related to receiving the paging information, and receiving the paging information in the one or more paging cycles indicated by the PEI.

Certain aspects can be implemented in a method for wireless communication performed by a user equipment (UE). The method generally includes determining a set of paging cycles for receiving paging information from a base station (BS), receiving a paging early indicator (PEI) from the BS indicating whether the UE should receive the paging information in one or more paging cycles of the set of paging cycles, wherein the PEI provides an indication related to at least one of a legacy paging physical downlink control channel (PDCCH) or a legacy paging physical downlink shared channel (PDSCH), and taking one or more actions based on the indication related to at least one of the legacy PDCCH or the legacy PDSCH.

Certain aspects can be implemented in a method for wireless communication performed by a user equipment (UE). The method generally includes determining a set of paging cycles for receiving paging information from a base station (BS), detecting at least one of: a paging early indicator (PEI) indicating that the paging information will not be transmitted in one or more paging cycles of the set of paging cycles or that the PEI for one or more paging cycles of the set of paging cycles has not been received, and taking one or more actions related to a legacy paging physical downlink control channel (PDCCH) based on the detection.

Certain aspects can be implemented in a method for wireless communication performed by a base station (BS). The method generally includes determining a set of paging cycles for transmitting paging information to a user equipment (UE), transmitting a first paging early indicator (PEI) to the UE in a first paging cycle of the set of paging cycles, wherein the first PEI indicates whether the paging information will be transmitted to the UE in one or more second paging cycles of the set of paging cycles occurring after the first paging cycle, and transmitting the paging information in the one or more second paging cycles indicated by the first PEI.

Certain aspects can be implemented in a method for wireless communication performed by a base station (BS). The method generally includes determining a set of paging cycles for transmitting paging information to a user equipment (UE), transmitting a paging early indicator (PEI) to the UE, wherein the PEI includes: an indication to the UE whether paging information will be transmitted in one or more paging cycles of the set of paging cycles and additional information related to receiving the paging information, and transmitting the paging information in the one or more paging cycles indicated by the PEI.

Certain aspects can be implemented in a method for wireless communication performed by a base station (BS). The method generally includes determining a set of paging cycles for transmitting paging information to a user equipment (UE) and transmitting a paging early indicator (PEI) to the UE indicating whether the UE should receive the paging information in one or more paging cycles of the set of paging cycles, wherein the PEI provides an indication related to at least one of a legacy paging physical downlink control channel (PDCCH) or a legacy paging physical downlink shared channel (PDSCH).

Other aspects provide: an apparatus operable, configured, or otherwise adapted to perform the aforementioned methods as well as those described elsewhere herein; non-transitory, computer-readable media comprising instructions that, when executed by one or more processors of a processing system, cause the processing system to perform the aforementioned methods as well as those described elsewhere herein; a computer program product embodied on a computer readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF THE FIGURES

The appended figures depict certain features of the various aspects described herein and are not to be considered limiting of the scope of this disclosure.

FIGS. 3A, 3B, 3C, and 3D depict various example aspects of data structures for a wireless communication network.

DETAILED DESCRIPTION

Aspects of the present disclosure provide systems and methods for paging based on a paging early indication (PEI). For example, in some cases, a user equipment (UE) may be configured with a set of paging cycles for receiving paging information from a base station (BS) of a wireless communications network. In some cases, a PEI may be provided to a UE in a first paging cycle of the set of paging cycles that indicates whether the paging information will be transmitted to the UE in one or more second paging cycles of the set of paging cycles occurring after the first paging cycle. By transmitting the PEI in the first paging cycle, the UE may have ample time to determine and receive a specific number synchronization signal block (SSB) bursts or reference signal (RS) occasions necessary for receiving the paging information transmitted in the one or more second paging cycles. Further, such techniques may allow the UE to conserve power by deciding to forego receiving certain SSB bursts or RS occasions before the reception of the paging information. Additionally, these techniques may be applicable to all UEs within the network regardless of downlink channel conditions or hardware capability of the UEs. For example, such techniques allow the BS to transmit the PEI in a single location of the first paging cycle for all the UEs, regardless of downlink channel conditions and hardware capability of the UEs, thereby conserving power at the BS and reducing signaling overhead.

Introduction to Wireless Communication Networks

Figure 1:
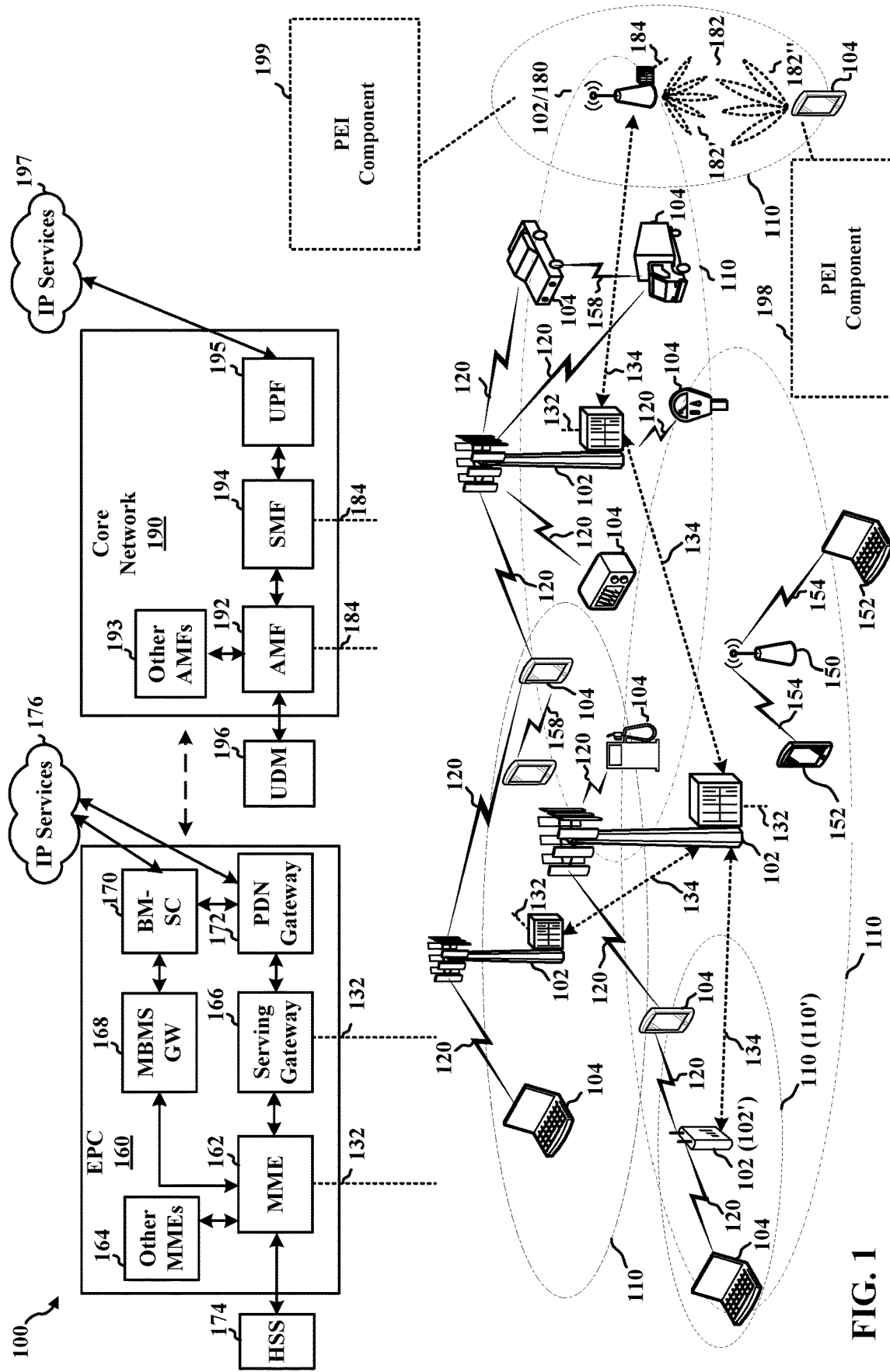
FIG. 1 is a block diagram conceptually illustrating an example wireless communication network.

FIG. 1 depicts an example of a wireless communication network 100, in which aspects described herein may be implemented.

Generally, wireless communication network 100 includes base stations (BSs) 102, user equipments (UEs) 104, an Evolved Packet Core (EPC) 160, and core network 190 (e.g., a 5G Core (5GC)), which interoperate to provide wireless communications services.

BSs 102 may provide an access point to the EPC 160 and/or core network 190 for a UE 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. Base stations may include and/or be referred to as a gNB, Node B, eNB, an access point, a base transceiver station, a radio base station, a radio transceiver, or a transceiver function, or a transmit reception point (TRP) in various contexts.

BSs 102 wirelessly communicate with UEs 104 via communications links 120. Each of BSs 102 may provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

The communication links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Figure 5:
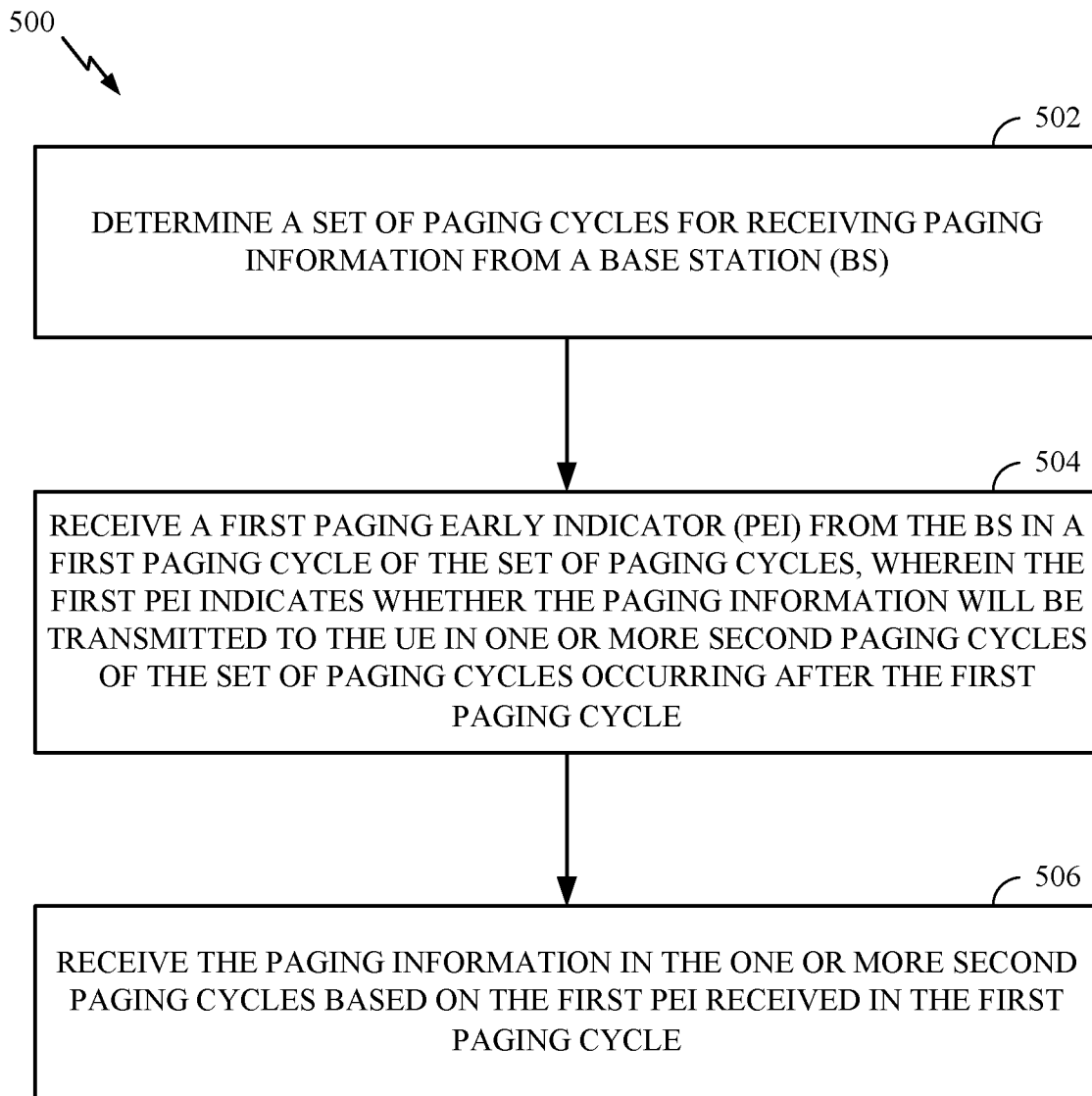
FIG. 5 is a flow diagram illustrating example operations for wireless communication by a UE, in accordance with certain aspects of the present disclosure.
Figure 6:
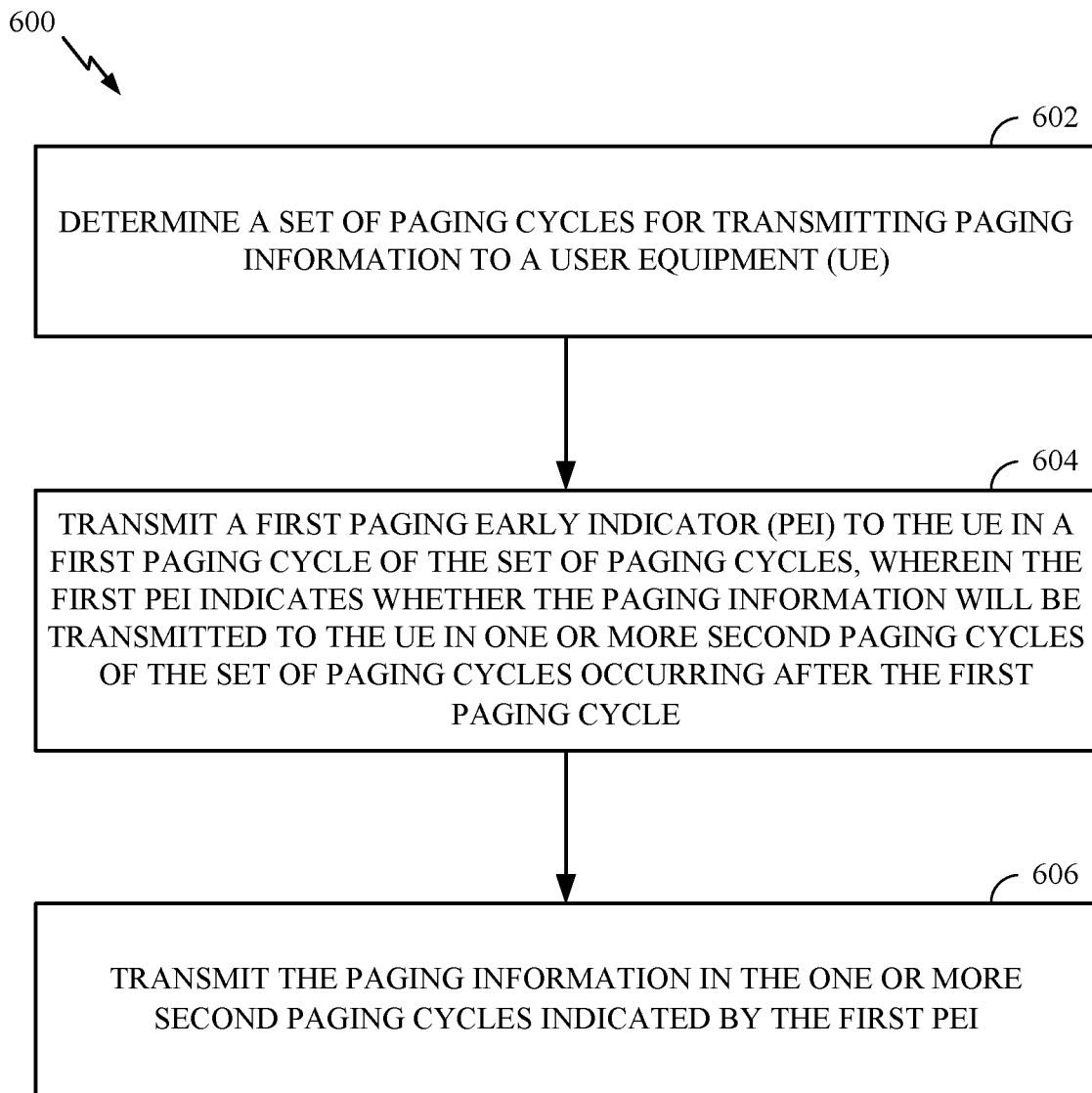
FIG. 6 is a flow diagram illustrating example operations for wireless communication by a BS, in accordance with certain aspects of the present disclosure.
Figure 8:
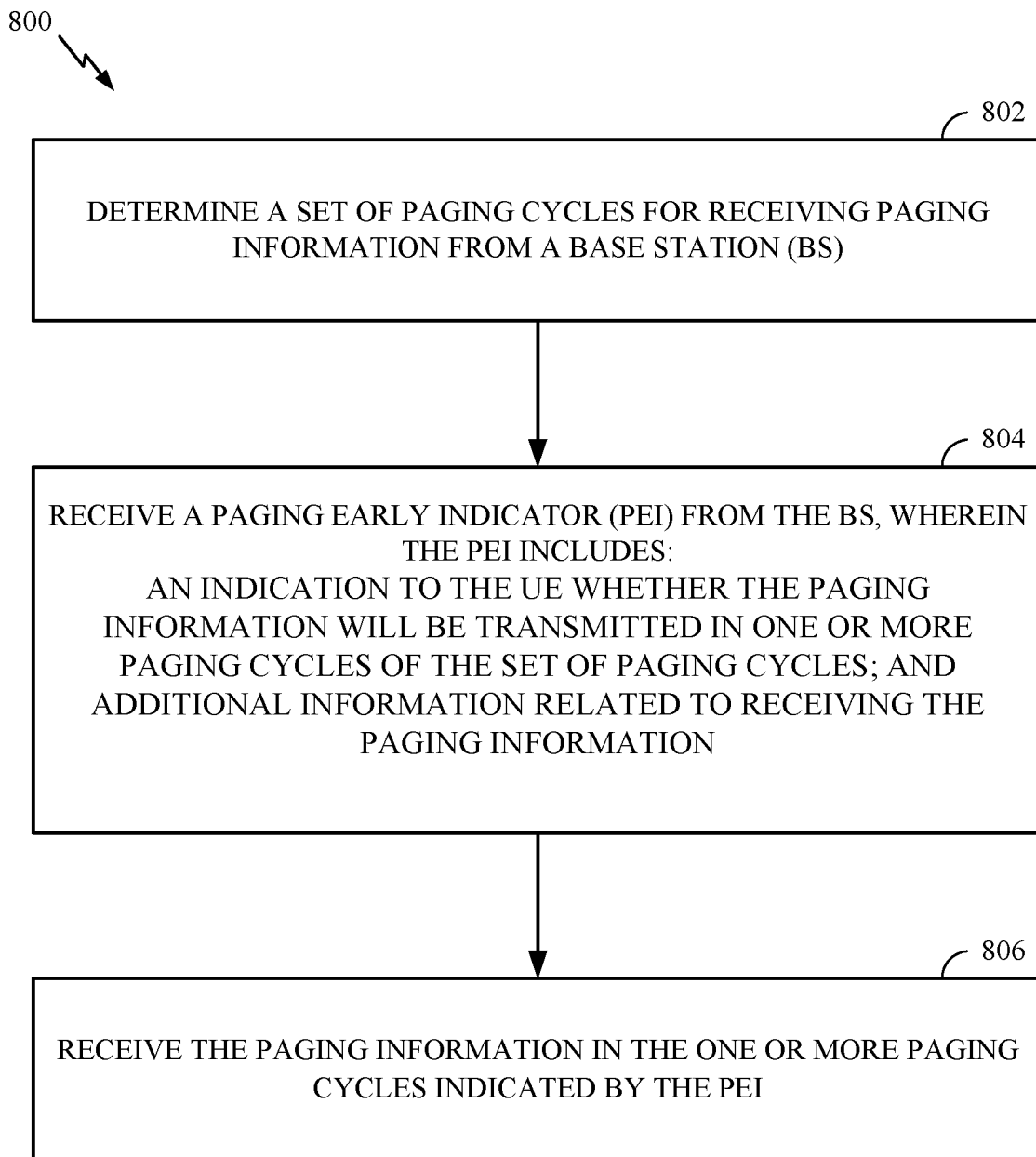
FIG. 8 is a flow diagram illustrating example operations for wireless communication by a UE, in accordance with certain aspects of the present disclosure.
Figure 9:
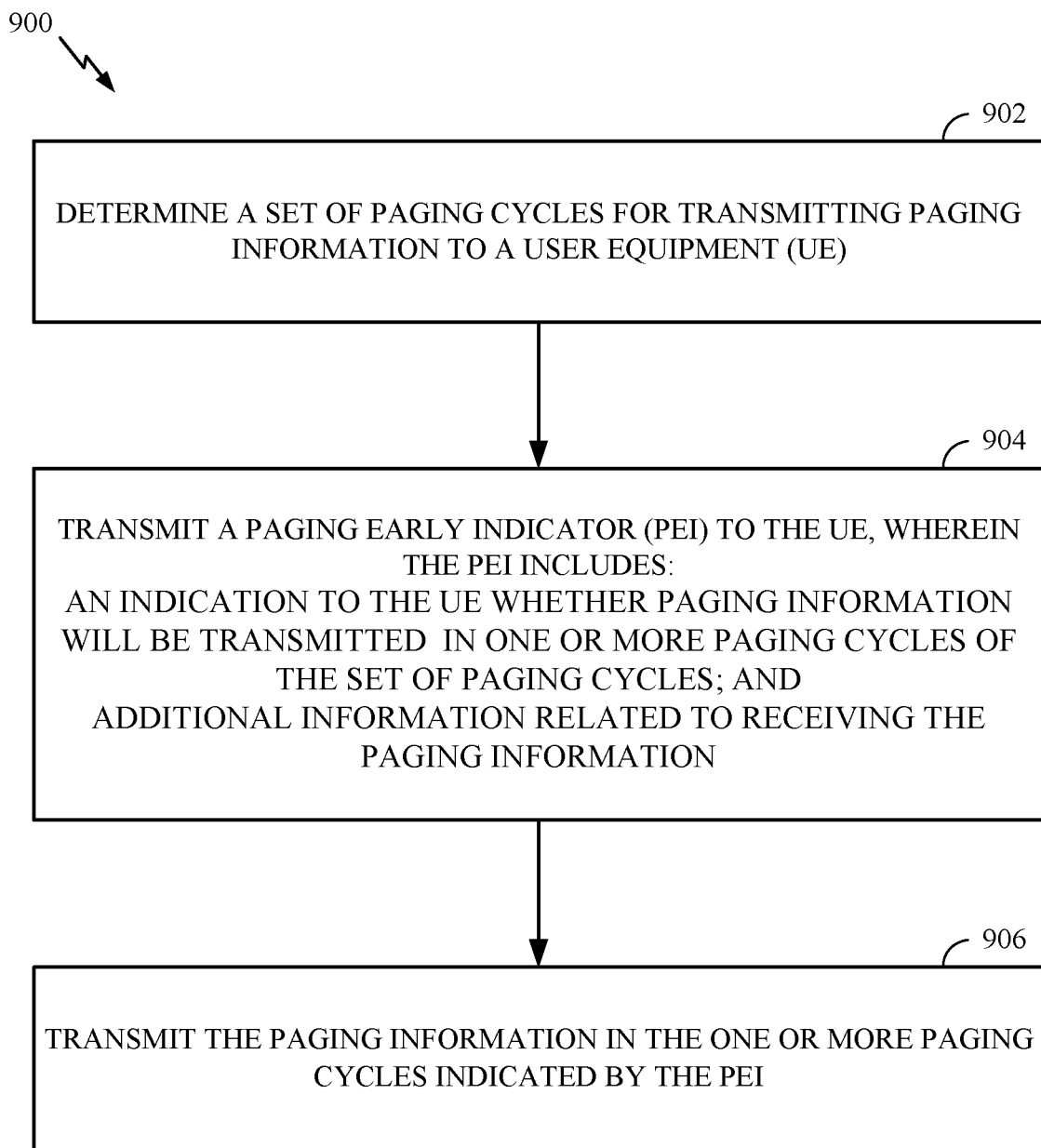
FIG. 9 is a flow diagram illustrating example operations for wireless communication by a BS, in accordance with certain aspects of the present disclosure.
Figure 10:
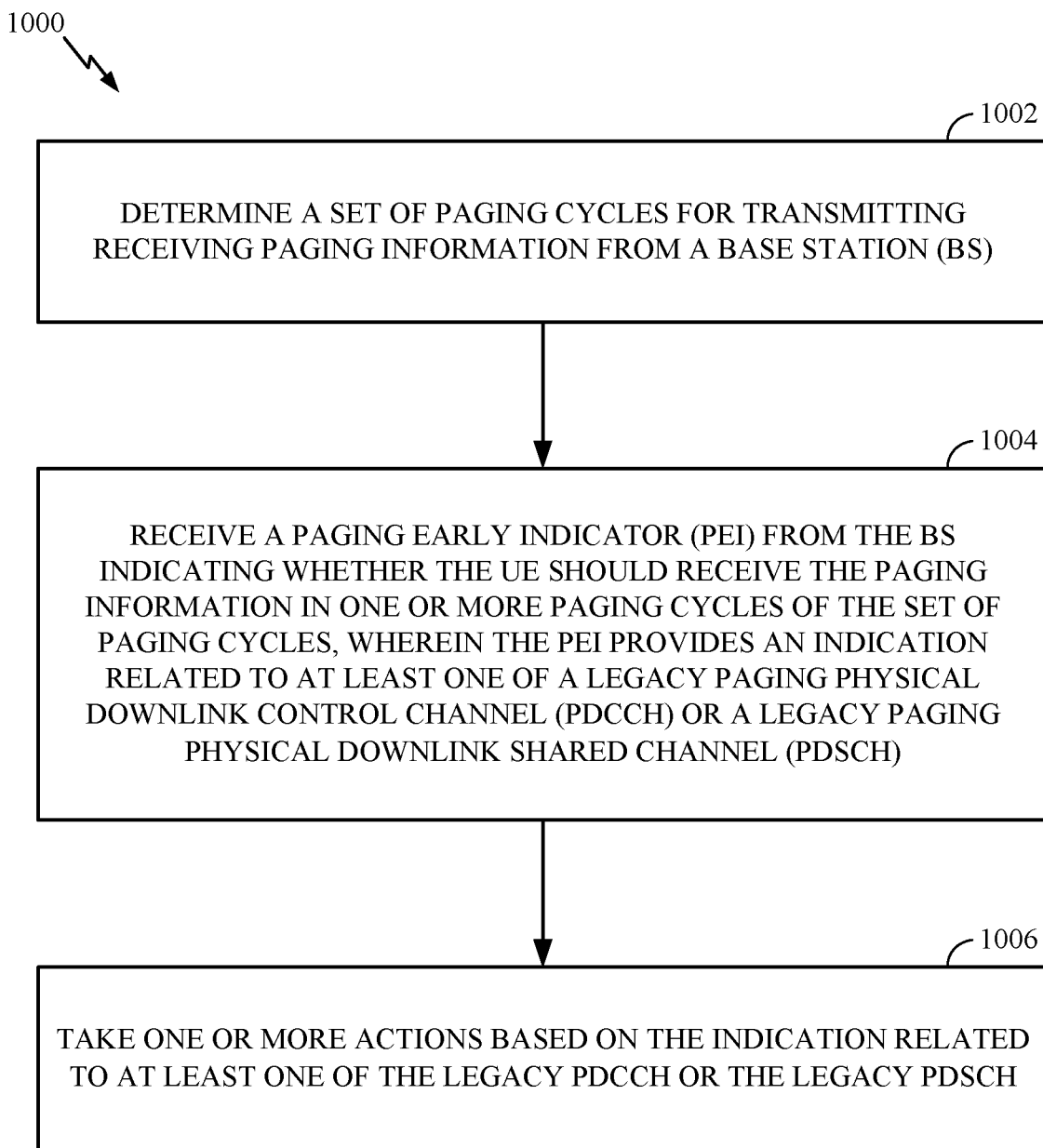
FIG. 10 is a flow diagram illustrating example operations for wireless communication by a UE, in accordance with certain aspects of the present disclosure.
Figure 11:
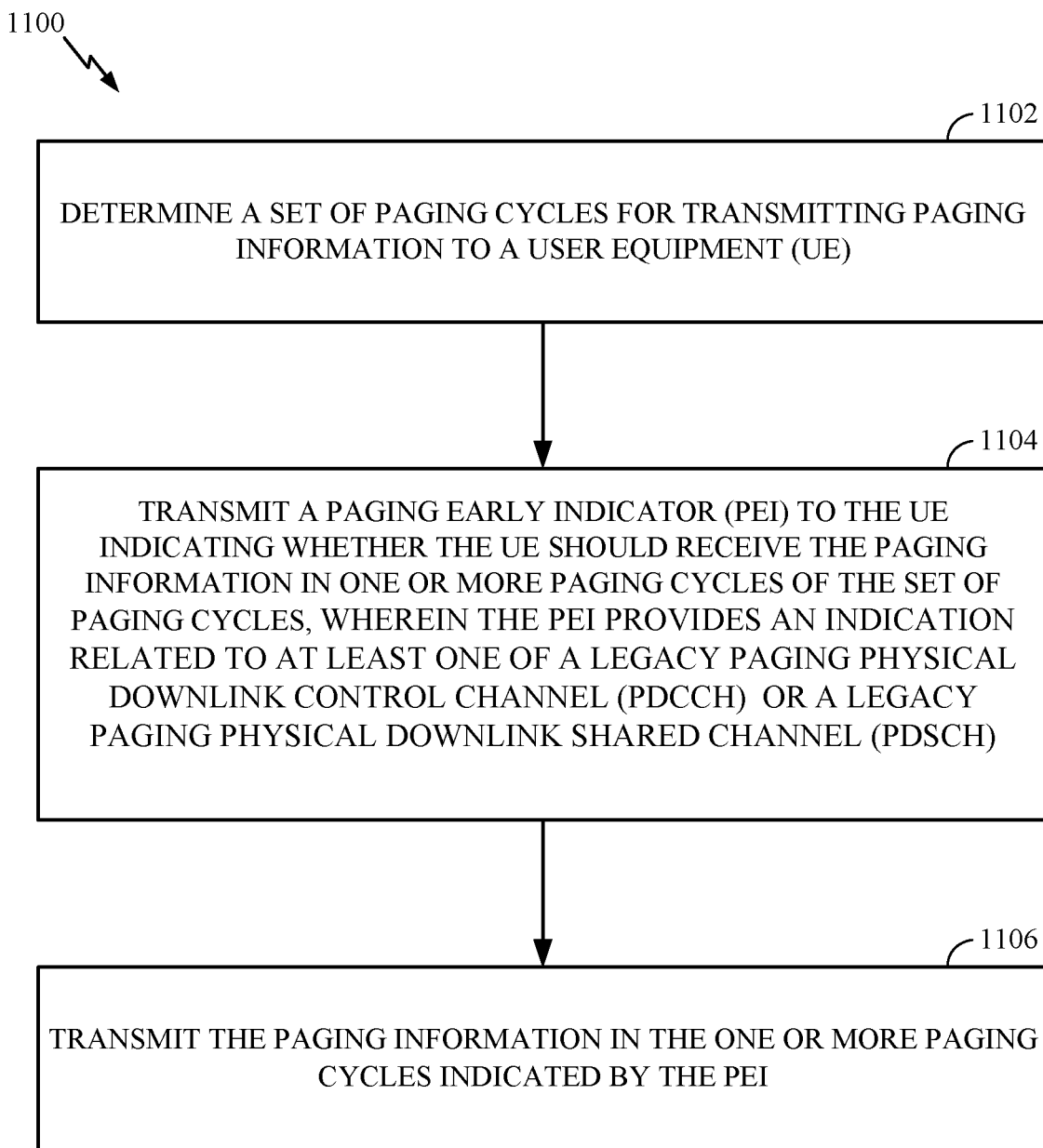
FIG. 11 is a flow diagram illustrating example operations for wireless communication by a BS, in accordance with certain aspects of the present disclosure.

BS 102 in the wireless communication network 100 may include a paging early indication (PEI) component 199, which may be configured to perform the operations shown in FIGS. 6, 9, and 11, as well as other operations described herein for paging based on a PEI. Additionally, a UE 104 in wireless communication network 100 may include a PEI component 198, which may be configured to perform the operations shown in FIGS. 5, 8, 10, and 12, as well as other operations described herein for paging based on a PEI.

Figure 2:
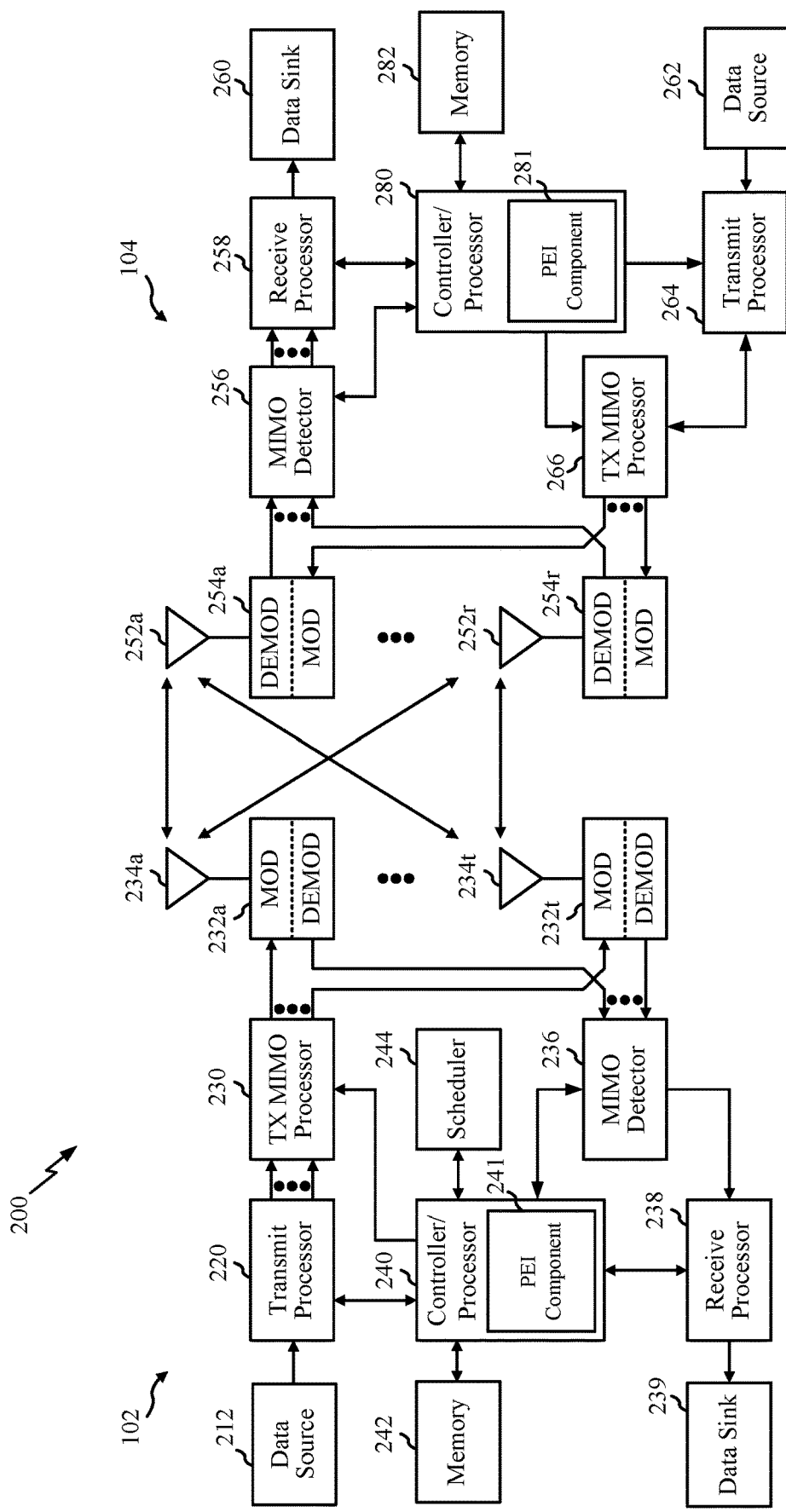
FIG. 2 is a block diagram conceptually illustrating aspects of an example a base station (BS) and user equipment (UE).

FIG. 2 depicts aspects of a base station (BS) 102 and a user equipment (UE) 104.

Generally, BS 102 includes various processors (e.g., 220, 230, 238, and 240), antennas 234a-t, transceivers 232a-t, and other aspects, which are involved in transmission of data (e.g., data source 212) and reception of data (e.g., data sink 239). For example, BS 102 may send and receive data between itself and UE 104. BS 102 includes controller/processor 240, which comprises PEI component 241. The PEI component 241 may be configured to implement the PEI component 199 of FIG. 1.

Generally, UE 104 includes various processors (e.g., 258, 264, 266, and 280), antennas 252a-r, transceivers 254a-r, and other aspects, involved in transmission of data (e.g., data source 262) and reception of data (e.g., data sink 260). UE 104 includes controller/processor 280, which comprises PEI component 281. The PEI component 281 may be configured to implement the PEI component 198 of FIG. 1.

FIGS. 3A-3D depict aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A-3D are provided later in this disclosure.

Aspects Related to Paging Early Indication Techniques

In some cases, user equipments (UEs) may operate in different modes, such as a connected mode, an idle mode, or an inactive mode. In some cases, a UE may operate in the idle or the inactive mode to conserve power. Generally, when operating in the idle or inactive mode, the UE may reduce its signaling and processing capabilities to conserve power. However, the UE operating in the idle or inactive mode may still consume some amount of power to maintain connection with a network and to monitor for paging messages from the network. Generally, the most power consuming operations performed by the UE in idle or inactive mode include frequency tracking loop update procedures, for example, where the UE estimates a downlink carrier frequency offset from received reference signals and applies a correction to the received signals to remove the frequency offset. Additionally, radio link management (RRM) measurements and monitoring for and receiving paging messages may consume a significant amount of power while in the idle or inactive mode.

In some cases, power consumption at the UE may depend on and be different for different downlink channel conditions, different device types (enhanced mobile broadband (eMBB) devices or reduced capability (RedCap) devices, such as internet of things (IoT) devices) and whether UE is paged or not. For example, in some cases, when a UE is in bad channel conditions (e.g., on a cell edge) with low signal to interference plus noise ratio (SINR), the UE may need to consume more power to receive and process more synchronization signal block (SSB) bursts to maintain time, frequency and gain tracking accuracy. In other cases, when the UE is in good channel conditions (e.g., located in a center of a cell) with high SINR, the UE may not need not to perform inter-frequency measurement, allowing the UE to consume power. Further, in some cases, RedCap UEs may need to consume more power to process additional SSB bursts for maintaining tracking loop accuracy due to a reduced number and size of antennas and reduced bandwidth. Moreover, in some cases, if the UE is paged, the UE may need to consume more power to process more SSB bursts to receive a paging message transmitted on a physical downlink shared channel (PDSCH) reception than for receiving a paging message transmitted on a physical downlink control channel (PDCCH) due to a higher synchronization requirement for PDSCH.

In some cases, when in the idle or inactive mode, the UE may typically remain in a sleep state to conserve power and may periodically wake up in a paging cycle or discontinuous reception (DRX) cycle to monitor for a paging message from the network in a paging occasion of the paging cycle. In some cases, the UE's ability to monitor for and correctly receive paging messages from the network may depend on the time, frequency and gain tracking accuracy maintained during RRM measurement. For example, in order to monitor for and correctly receive a paging message during a paging occasion, the UE may need to ensure that its time, frequency and gain tracking accuracy is maintained at or above a particular level, especially for paging messages sent on a PDSCH which has a higher synchronization requirement. To maintain the time, frequency and gain tracking accuracy is maintained at or above a particular level, the UE may need to monitor for and receive one or more SSBs prior to the paging occasion.

However, the number of SSBs needed to maintain the time, frequency and gain tracking accuracy of the UE at or above the particular level may depend on various factors, such as channel conditions, hardware capability of the UE, and the like. For example, in some cases, if the UE is in poor channel conditions the UE may need to receive and process more SSBs to maintain the time, frequency and gain tracking accuracy of the UE to receive a paging message as compared to the case where the UE is in good channel conditions. Consequently, the UE may consume more power when receiving and processing SSBs in poor channel conditions as compared to when the UE is in good channel conditions.

In some cases, to conserve additional power at the UE, the network may transmit a paging early indicator (PEI) to the UE that informs the UE whether the UE is being paged during a paging cycle in which the PEI is received/transmitted. In some cases, if the PEI indicates that the UE is not being paged within the paging cycle, the UE may decide to remain asleep, skipping the receiving and processing of SSB bursts. If, however, the PEI indicates that the UE is being paged within the paging cycle, the UE may wake up to receive and process SBB bursts, for example, to synchronize with the network and update a tracking loop to receive the paging message within the paging cycle.

As noted above, in some cases, a number of SSBs that a particular UE may need to receive and process in response to a PEI that indicates to the UE to receive a paging message in a paging occasion of a paging cycle may depend on the channel conditions of the UE. Accordingly, as SSBs within a paging cycle are transmitted sequentially in time prior to the paging occasion, the network may need to determine a particular location to transmit a PEI within the paging cycle to afford the particular UE time to receive and process a sufficient number of SSBs to receive the paging message within the paging occasion of the paging cycle.

Figure 4:
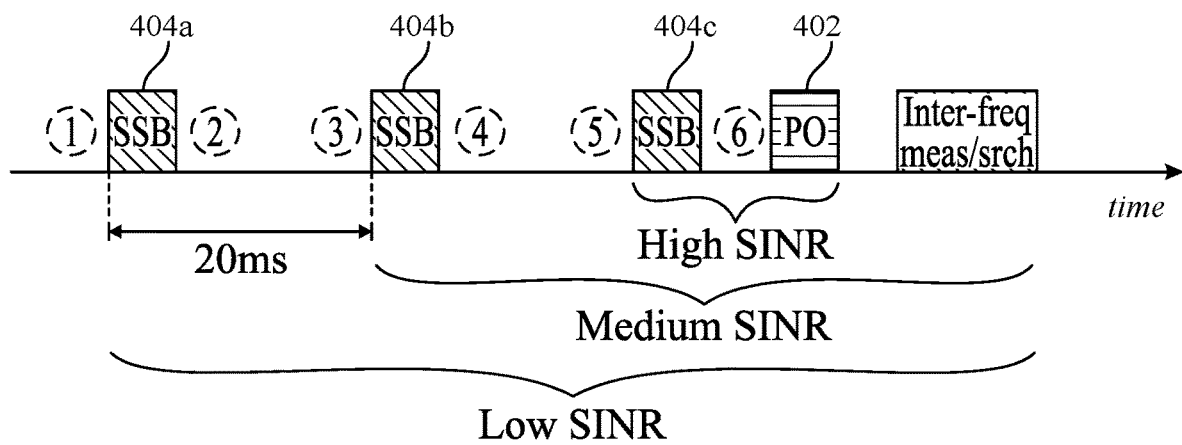
FIG. 4 illustrates an example paging cycle of a UE with different locations for transmitting a paging early indication (PEI).

FIG. 4 illustrates an example paging cycle 400 of a UE with different locations for a base station to transmit a PEI. For example, as illustrated, the paging cycle 400 may include a paging occasion 402 in which a paging message for the UE may be carried. Additionally, as shown, a plurality of SSBs (e.g., SSB 404a, SSB 404b, and SSB 404c) transmitted sequentially in the paging cycle that the UE may use to synchronize with the network and update a tracking loop to receive a paging message in the paging occasion 402. As noted above, depending on the channel conditions of the UE, the UE may need to receive and process different numbers of SSBs to ensure time, frequency and gain tracking accuracy.

For example, when the UE is in good channel conditions with a high SINR, the UE may only need to receive SSB 404c (e.g., transmitted nearest to the paging occasion 402), allowing the UE to forego receiving and processing SSB 404a and SSB 404b, thereby conserving power at the UE. When the UE is in mediocre channel conditions with a medium SINR, the UE may need to receive two SSBs, such as SSB 404b and SSB 404c. In this case, the UE may still forego receiving and processing SSB 404a (e.g., furthest away from the paging occasion 402), allowing the UE to conserve power. However, when the UE is in poor channel conditions, the UE may need to receive three SSBs (e.g., SSB 404a, SSB 404b, and SSB 404c) to maintain time, frequency and gain tracking accuracy.

Thus, depending on the DL channel conditions of the UE, there may be different advantageous locations in the paging cycle for transmitting a PEI to inform the UE that the UE will be paged in the paging occasion 402. For example, six different locations are shown in the paging cycle 400 of FIG. 4, each of which may be advantageous for UEs in different channel conditions. For example, in some cases, it may be advantageous for the network to transmit a PEI in locations 5 or 6 for a UE in good channel conditions with high SINR as the UE may then be able to conserve power by choosing to forego receiving and processing SSB 404a and SSB 404b. In other cases, it may be advantageous for the network to transmit a PEI in locations 1 or 2 to provide UEs in poor channel conditions with low SINR a chance to receive SSB 404a, SSB 404b, and SSB 404c, improving time, frequency and gain tracking accuracy.

However, in many cases, the network may not know the DL channel condition of idle/inactive mode UEs and, thus, may not know the location within the paging cycle 400 most advantageous to transmit a PEI for a particular UE. Therefore, since different UEs within the network may each have different DL channel conditions, the network may have to transmit the PEI at multiple different locations so that all UEs within the network can benefit (e.g., conserve power) from the PEI, which increases signaling overhead and power consumption at the network.

Therefore, aspects of the present disclosure provide techniques to improve power savings at the network and reduce signaling overhead associated with paging based on a single PEI transmission for all UEs with different DL channel conditions and different hardware capabilities. For example, such techniques may involve transmitting a first PEI in a first paging cycle indicating whether paging information will be transmitted to a UE in a second paging cycle occurring after the first paging cycle, allowing the UE an opportunity to determine how many SSBs or reference signal (RS) occasions to receive in the second paging cycle before receiving the paging information. For example, in some cases, UEs in good channel conditions may choose to receive fewer SSBs in the second paging cycle before receiving the paging information to conserve power. Conversely, UEs in poor channel conditions may choose to receive more SSBs in the second paging cycle before receiving the paging information to improve time, frequency and gain tracking accuracy. Additionally, in some cases, to increase power savings, the first PEI may be transmitted within or within some threshold time of a paging occasion in the first paging cycle such that UEs do not have to separately wake up from sleep period to receive the first PEI.

In some cases, these PEI transmission techniques may be suitable for UEs that can tolerate more latency for paging reception. For example, the network may postpone transmitting the paging message to a UE by one or more paging cycles without causing a material impact to the UE's paging performance. In some cases, such UEs may include Release 17 RedCap UEs (or even lower power consumption device in future releases) that are capable of staying in idle/inactive mode most of the time and are not sensitive to an increase of paging latency.

FIG. 5 depicts a process 500 for wireless communication. By way of example, a UE (e.g., such as the UE 104 in the wireless communication network 100), or a portion thereof, may perform, or be configured, operable, or adapted to perform, operations of the process 500 for receiving paging information according to a PEI. By way of another example, operations of the process 500 may be implemented as software components that are executed and run on one or more processors (e.g., controller/processor 280 of FIG. 2). Signals involved in the operations may be transmitted or received by the UE by one or more antennas (e.g., antennas 252 of FIG. 2), or via a bus interface of one or more processors (e.g., the controller/processor 280) obtaining and/or outputting the signals.

Process 500 begins at block 502 by determining a set of paging cycles for receiving paging information from a base station (BS).

At block 504, the UE receives a first PEI from the BS in a first paging cycle of the set of paging cycles, wherein the first PEI indicates whether the paging information will be transmitted to the UE in one or more second paging cycles of the set of paging cycles occurring after the first paging cycle.

At block 506, the UE receives the paging information in the one or more second paging cycles based on the first PEI received in the first paging cycle.

FIG. 6 depicts a process 600 for wireless communication. By way of example, a BS (e.g., such as the BS 102 in the wireless communication network 100), or a portion thereof, may perform, or be configured, operable, or adapted to perform, operations of the process 600 for transmitting paging information according to a PEI. By way of another example, operations of the process 600 may be implemented as software components that are executed and run on one or more processors (e.g., controller/processor 240 of FIG. 2). Signals involved in the operations may be transmitted or received by the BS by one or more antennas (e.g., antennas 234 of FIG. 2), or via a bus interface of one or more processors (e.g., the controller/processor 240) obtaining and/or outputting the signals.

Process 600 begins at block 502 by determining a set of paging cycles for transmitting paging information to a UE.

At block 604, the BS transmits a first PEI to the UE in a first paging cycle of the set of paging cycles, wherein the first PEI indicates whether the paging information will be transmitted to the UE in one or more second paging cycles of the set of paging cycles occurring after the first paging cycle.

At block 606, the BS transmits the paging information in the one or more second paging cycles indicated by the first PEI.

Additional Details Regarding Paging Early Indication

As noted above, in some cases, a base station (e.g., BS 102 in FIG. 1) may transmit a first PEI to a UE (e.g., UE 104 in FIG. 1) in a first paging cycle of a set of paging cycles. In some cases, the first PEI indicates whether paging information will be transmitted to the UE in one or more second paging cycles of the set of paging cycles occurring after the first paging cycle.

Figure 7A:
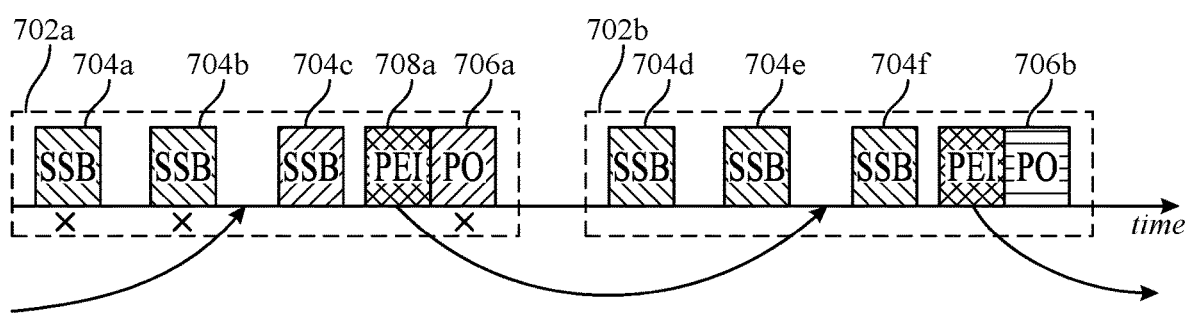
FIGS. 7A, 7B, and 7C illustrate example timelines showing different options for transmission of a first PEI, in accordance with certain aspects of the present disclosure.

FIG. 7A illustrates an example timeline showing transmission of the first PEI in a first paging cycle which indicates whether paging information will be transmitted to the UE in a second paging cycle, in accordance with certain aspects of the present disclosure. For example, as shown, FIG. 7A includes two paging cycles: a first paging cycle 702a and a second paging cycle 702b. As illustrated, each of the first paging cycle 702a may include a first plurality of SSBs (e.g., SSB 704a, SSB 704b, and SSB 704d), which may be used by the UE to synchronize with the BS (e.g., or network associated with the BS) and maintain time, frequency and gain tracking accuracy. Additionally, the first paging cycle 702a may include a first paging occasion 706a in which the UE may wake up from a sleep period to monitor for paging information transmitted by the BS. In other words, the first paging occasion 706a is a period of time (e.g., a time window) within the first paging cycle 702a in which the UE is awake and monitors for paging information transmitted by the BS. Likewise, the second paging cycle 702b may include a second plurality of SSBs (e.g., SSB 704d, SSB 704e, and SSB 704f) and a second paging occasion 706b.

In some cases, the BS may transmit a first PEI 708a to the UE within the first paging cycle 702a. In some cases, the first PEI 708a may include the first PEI transmitted by the BS at block 604 of FIG. 6 and received by the UE at block 504 of FIG. 5. According to aspects, the first PEI 708a may indicate whether paging information will be transmitted to the UE in the second paging cycle 702b (or one or more subsequent paging cycles) occurring after the first paging cycle 702a.

In some cases, to reduce power consumption at the UE, may be transmitted at a single location within the first paging cycle 702a (e.g., as opposed to multiple locations as described above) and within or close to (e.g., within a threshold time from) the first paging occasion 706a of the first paging cycle 702a. In other words, in some cases, the first PEI 708a may be transmitted within the first paging occasion 706a (e.g., associated with the UE) in the first paging cycle 702a. In other cases, the first PEI 708a may be transmitted within a time window occurring before, but within a threshold amount of time from, the first paging occasion 706a in the first paging cycle 702a. By transmitting the first PEI 708a within the first paging occasion 706a or within a threshold amount of time from the first paging occasion 706a, the UE may not need to wake up from the sleep period to separately receive the first PEI 708a. The UE may instead use a single wakeup period to receive the first PEI 708a for second paging cycle 702b and process the first paging occasion 706a of the first paging cycle 702a (e.g., if the UE is paged in the first paging cycle 702a). In other words, the UE may use an already-scheduled wakeup period for the first paging occasion 706a to receive the first PEI 708a, thereby conserving power (or at least not consuming much additional power to receive the UE).

In some cases, if the first PEI 708a indicates that paging information will be transmitted to the UE in the second paging cycle 702b, the UE may receive the paging information within the second paging occasion 706b in the second paging cycle 702b (e.g., based on the first PEI 708a received in the first paging cycle 702a). In some cases, depending on whether the first PEI 708a indicates the UE is paged in the second paging cycle 702b, the UE may determine at least one of a number of SSB bursts to receive or a number of RS occasions to receive within the second paging cycle 702b (and the one or more subsequent paging cycles) before receiving the paging information in the second paging occasion 706b.

In some cases, the number of SSB bursts to receive and the number of RS occasions to receive may be based on one or more factors. For example, in some cases, determining at least one of the number of SSB bursts to receive or number of RS occasions to receive may be based on downlink channel conditions associated with the UE. For example, if the UE is in poor channel conditions, the UE may determine to receive a greater number of SSB bursts or RS occasions as compared to the case where the UE is in good channel conditions. In some cases, determining at least one of the number of SSB bursts to receive or the number of RS occasions to receive may be based on a capability (e.g., a hardware capability) associated with the UE to receive and process the SSB bursts and/or RS occasions. For example, if the number of receive antennas and/or size of receive antennas is limited, the UE may decide to receive a greater number of SSB bursts and/or RS occasions as compared to the case where the capability of the UE to receive SSBs and/or RS occasions is more advanced. Additionally, in some cases, at least one of the number of SSB bursts to receive or the number RS occasions to receive may be based on a type of physical channel over which the paging information is received. For example, the UE may determine to receive more SSB bursts and/or RS occasions for paging information transmitted on a PDSCH (e.g., which has a higher synchronization requirement) as compared to a paging PDCCH.

An example of determining the number of SSB bursts/RS occasions to receive is illustrated in FIG. 7A. For example, as shown, in response to the first PEI 708a received in first paging cycle 702a, the UE may determine to receive SSB 704d, SSB 704e, and SSB 704f in the second paging cycle 702b before receiving the paging information (e.g., a paging PDSCH) in the second paging occasion 706b. In some cases, as noted above, the UE's determination to receive SSB 704d, SSB 704e, and SSB 704f may be based on DL channel conditions associated with the UE or a hardware capability associated with the UE. In the example shown in FIG. 7A, the UE may have determined to receive three SSB bursts (e.g., SSB 704d, SSB 704e, and SSB 704f) due to poor channel conditions.

Additionally, in some cases, if the UE receives a PEI that indicates that the UE will not be paged in a particular paging cycle, then the UE may determine to forego receiving SSB bursts/RS occasions within that particular paging cycle. For example, with reference to FIG. 7A, in some cases, the UE may have received a second PEI in a paging cycle occurring before the first paging cycle 702a which indicated that the UE was not to be paged in the first paging cycle 702a. Accordingly, in response to the indication that the UE will not be paged in the first paging cycle 702a, the number of SSB bursts/RS occasions to receive determined by the UE may be lower. For example, as shown in the first paging cycle 702a of FIG. 7A, the letter 'x' is shown below SSB 704a and SSB 704b, demonstrating that the UE has determined to not receive or process these SSB bursts, instead remaining asleep to conserve power. Additionally, since the UE is not being paged in the first paging occasion 706a (e.g., as indicated by the second PEI received in the paging cycle prior to the first paging cycle 702a), the letter 'x' is shown below the first paging occasion 706a to demonstrate that the UE has determined to remain asleep to conserve power during the first paging occasion 706a. While the UE determines to not receive SSB 704a and SSB 704b in the first paging cycle 702a, the UE may still decide to receive SSB 704c to ensure some level of synchronization with the network to receive the first PEI 708a.

According to aspects, as noted above, an advantage of this cross-paging cycle PEI design (e.g., that a PEI in one paging cycle indicates whether a UE is paged in a subsequent paging cycle) is that a single PEI location (e.g., within a paging occasion) may be optimal for all UEs in different DL channel conditions. Additionally, such PEI design may allow for UEs to determine exactly the number of SSB bursts and RS occasions to process in the paging cycle indicated by the PEI before receiving the paging information. While this design may increase a paging delay associated with receiving the paging information, this increased paging delay may not be an issue for certain devices, such as 5G new radio (NR) wearable devices and many internet of things (IoT) devices. Additionally, as noted above, the PEI design described above may allow for power savings at both the network and the UE. For example, such design allows the network to conserve power by only transmitting the PEI in a single location as opposed to multiple locations, which also decreases signaling overhead in the network. Further, this PEI design conserves power at the UE as the UE is able to adaptively decide not to receive and process certain SSB bursts/RS occasions, choosing instead to remain asleep in an idle/inactive mode.

In some cases, to save additional power, if the UE is paged by a PEI received in a previous paging cycle and hence processes a paging occasion in a current paging cycle, the UE may not receive another PEI in the current paging cycle. This essentially means that if the UE is already delay tolerant in idle/inactive mode, the UE does not have to receive paging information in back-to-back paging cycles. In some cases, if paging information needs to be transmitted in back-to-back paging cycles, the network may be able to combine the paging information (e.g., which would otherwise be transmitted in different paging cycles) into a same paging message (e.g., based on network implementation) transmitted in only one paging cycle.

Figure 7B:
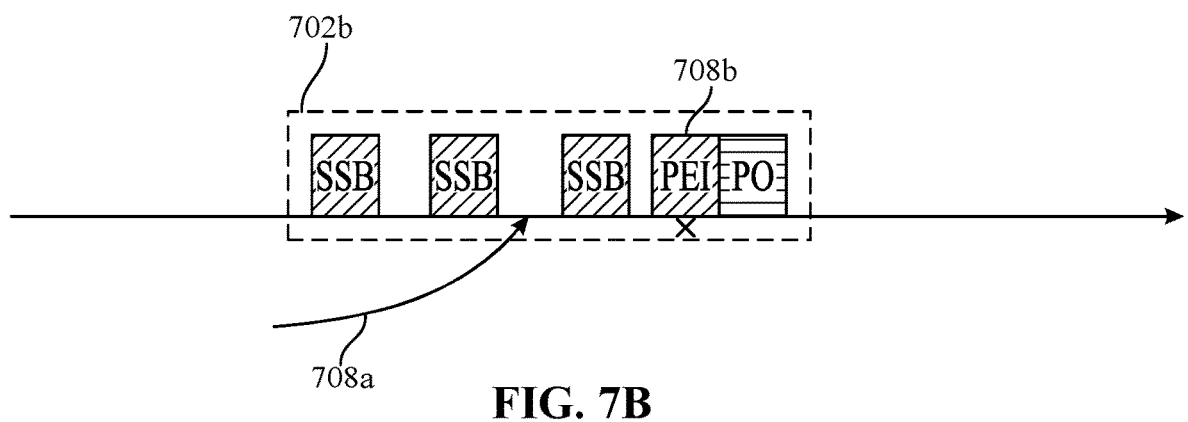
Figure 7C:
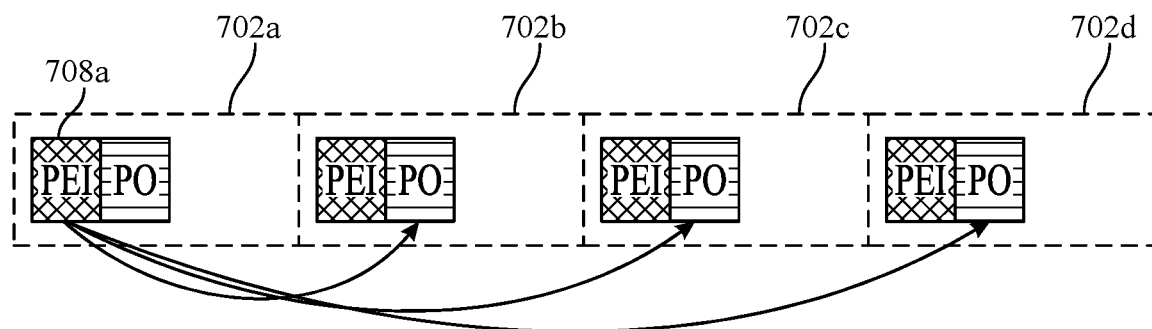

FIG. 7B illustrates an example of a PEI not being transmitted in back-to-back paging cycles, in accordance with certain aspects of the present disclosure. For example, FIG. 7B again illustrates the second paging cycle 702b and the first PEI 708a of FIG. 7A. According to aspects, since the first PEI 708a is transmitted in the first paging cycle 702a illustrated in FIG. 7A and indicates that paging information will be transmitted to the UE in the second paging cycle 702b, the network may refrain from transmitting a second PEI 708b in the second paging cycle 702b (or the one or more other paging cycles) indicated by the first PEI 708a, as illustrated in FIG. 7B. As such, the UE may not receive the second PEI 708b in the second paging cycle 702b indicated by the first PEI 708a. For example, as illustrated, the letter 'x' is depicted below the second PEI 708b to illustrated that the UE does not receive (e.g., and the network refrains from transmitting) the second PEI 708b. It should be understood that, while FIG. 7B illustrates the case where PEIs are not transmitted in back-to-back paging cycles, the PEI transmission in FIG. 7B is only one example and that PEIs may still be transmitted in back-to-back paging cycles, for example, as illustrated in FIG. 7C.

PEI Starting Configuration

In some cases, the techniques described above (e.g., with respect to a PEI in a first paging cycle indicating whether paging information will be transmitted in a second paging cycle) may be extended to a more flexible paging indication in the PEI. For example, the first PEI may indicate whether the UE is paged in a starting paging cycle and a number of consecutive paging cycles after the starting paging cycle. In other words, in some cases, the first PEI 708a (e.g., transmitted at 604 of FIG. 6 and received at 504 of FIG. 5) may be associated with a paging starting configuration. In some cases, the UE may receive the paging information at 506 of FIG. 5 in the one or more second paging cycles based further on the paging starting configuration.

Different options may be possible for the paging starting configuration. For example, in a first option, the paging starting configuration may indicate that the paging information will be received in the first paging cycle. For example, with reference to FIG. 7A, in some cases, the first PEI 708a may indicate that paging information will be transmitted to the UE in the first paging cycle 702a (e.g., in the first paging occasion 706a). Accordingly, in such cases, the UE may receive the paging information in the first paging cycle 702a based on the paging starting configuration.

In a second option, the paging starting configuration may indicate, for example, N consecutive paging cycles in which paging information will be transmitted starting from a current paging cycle, such as the paging cycle in which the first PEI is transmitted. In other words, the paging starting configuration may indicate a number of the one or more second paging cycles in which the paging information will be received and that the number of the one or more second paging cycles starts from the first paging cycle. An example of this option is illustrated in FIG. 7C.

For example, FIG. 7C again illustrates the first PEI 708a, the first paging cycle 702a, and second paging cycle 702b. FIG. 7C also illustrates two additional paging cycles: a third paging cycle 702c and a fourth paging cycle 702d. As shown, in some cases, a starting configuration associated with the first PEI 708a may indicate that paging information will be in three consecutive paging cycles (e.g., the second paging cycle 702b, the third paging cycle 702c, and the fourth paging cycle 702d) starting from the first paging cycle 702a in which the first PEI 708a is received.

In a third option, the paging starting configuration may indicate, for example, a specific paging cycle in which the paging information will be received by the UE. In other words, the paging starting configuration may indicate one specific paging cycle, from a set of paging cycles, occurring after the first paging cycle that the paging information will be received in by the UE.

In a fourth option, the paging starting configuration may indicate, for example, M consecutive paging cycles in which paging information will be transmitted starting from a further paging cycle, such as a paging cycle occurring after the paging cycle in which the first PEI is transmitted. In other words, in some cases, the paging starting configuration may indicate a number of the one or more second paging cycles in which the paging information will be received, wherein the number of the one or more second starts from a paging cycle occurring after the first paging cycle.

In some cases, which option of the starting paging configuration may be applied may be selected/configured by the network/BS in different manners. For example, in a first manner of selecting/configuring the paging starting configuration, the paging starting configuration may be based on a reported preference of the UE. For example, the UE may transmit an indication of the preference in a report to the BS. In some cases, the reported preference may indicate a paging delay threshold of the UE associated with the first PEI. Accordingly, the BS may select one of the four options for the paging starting configuration discussed above based on the paging delay threshold of the UE. The BS may then transmit signaling configuring the UE with the selected paging starting configuration option.

In a second manner of selecting/configuring the paging starting configuration, the paging starting configuration may be based on a wireless communication standard and on a category associated with the UE. In some cases, the category associated with the UE indicates a paging delay threshold of the UE associated with the first PEI. For example, in some cases, the BS may determine a category associated with the UE (e.g., in some cases based on capability information received from the UE). Thereafter, based on the determined category of the UE, the BS may use the wireless communication standard to determine a paging delay threshold of the UE. The BS may select one of the four options for the paging starting configuration discussed above based on the paging delay threshold of the UE. The BS may then transmit signaling configuring the UE with the selected paging starting configuration option.

Additionally, in a third manner of selecting/configuring the paging starting configuration, the paging starting configuration may be semi-statically configured by the BS in one of paging configuration information, a system information block (SIB), or a radio resource connection (RRC) release message transmitted to the UE during a UE RRC release procedure. For example, the BS may transmit signaling to the UE that semi-statically configures the UE to use one of the four paging starting configuration options discussed above. Accordingly, the UE may receive the indication of one of the four paging starting configuration options in the signaling and receive the paging information accordingly. The UE may continue to use that particular paging starting configuration option until the UE receives an indication of a new paging starting configuration option to use to receive paging information.

In a fourth manner of selecting/configuring the paging starting configuration, the paging starting configuration may be dynamically configured by the BS in the first PEI. For example, in some cases, the first PEI may include an indication of one of the four paging starting configuration options discussed above. Accordingly, the UE may receive the indication of one of the four paging starting configuration options in the first PEI and receive the paging information accordingly. Thereafter, when the UE receives an additional PEI, the UE may receive the paging information according to a new paging starting configuration option indicated in the additional PEI.

It should be noted that the different manners of selecting/configuring the different paging starting configuration options may be jointly applied to an idle/inactive mode UE. For example, the signaling that semi-statically configures the UE may include an indication of a maximum number of paging cycles for receiving the paging information (e.g., to be indicated by the first PEI) and the first PEI can dynamically change a number of actually indicated paging cycles for receiving the paging information.

Example Adaptive Paging Cycles Indicated Via PEI

According to aspects, the techniques discussed above may result in an adaptive paging cycle skipping technique. In other words, the first PEI discussed above may adaptively indicate to the UE whether to skip receiving paging information within a particular paging cycle. An alternative way to achieve a similar effect may be to use an adaptive paging cycle that is indicated by the PEI.

For example, in some cases, the BS may determine a set of paging cycles for transmitting paging information to the UE. Similarly, the UE may determine the set of paging cycles for receiving the paging information. Thereafter, the BS may transmit a PEI, which may be received by the UE. In some cases, the PEI includes an indication to the UE that paging information will be transmitted in one or more paging cycles of the set of paging cycles. The PEI may also include additional information related to receiving the paging information. The BS may then transmit the paging information in the one or more paging cycles indicated by the PEI, which may be received by the UE. In some cases, the paging information may be received by the UE in accordance with the additional information in the PEI.

In some cases, the additional information in the PEI related to receiving the paging information includes an indication of a cycle length of the one or more paging cycles to monitor for and receive the paging information (e.g., from the BS). In some cases, the cycle length may be dynamically indicated in each PEI that is received by the UE.

In some cases, the additional information may include flag that indicates one paging cycle of a defined group of paging cycles for receiving the paging information. For example, the UE may receive the flag and determine that the flag corresponds to a particular paging cycle. The UE may then receive the paging information according to the determined particular paging cycle. In some cases, the defined group of paging cycles may be configured to the UE in a system information block (SIB) or an radio resource control (RRC) release message from the BS (e.g., before the UE transitions to an idle/inactive mode). For example, the BS may transmit signaling to the UE including configuration information configuring the defined group of paging cycles.

In some cases, the configuration information may be transmitted in at least one of the SIB or the RRC release message.

In some cases, the flag may contain one bit to indicate whether the paging cycle is increased or decreased in relation to current paging cycle that the UE is operating according to. Accordingly, in some cases, the UE may adjust a current paging cycle according to the flag in the PEI and may thereafter receive the paging information in the one or more paging cycles based on the adjusted paging cycle. In some cases, an application delay for applying a new paging cycle received in the PEI may be defined as a time offset between the paging cycle where the PEI is received and the paging cycle where the UE starts to use the paging cycle indicated by the additional information in the PEI.

In some cases, the additional information related to receiving the paging information in the PEI may carry information that is typically carried in a paging PDCCH. An example of the information transmitted in a paging PDCCH is illustrated in Table 1, below.

TABLE 1

| Information included within a DCI format 1_0 paging PDCCH |
| --- |
| Short Messages Indicator |
| Short Messages |
| Scheduling information for a paging PDSCH |
| Reserved Bits |

Accordingly, for example, the additional information may include a short message indicator, indicating whether the UE should receive the paging information in the one or more paging cycles or a short message in the one or more paging cycles or both. In some cases, the additional information in the PEI may include a short message, indicating whether the UE should receive updated system information or an Earthquake and Tsunami Warning System (ETWS) message. In some cases, the additional information in the PEI may include both the short message indicator and the short message or part of the short message indicator and the short message.

Examples of the information carried in a short message indicator and a short message of a PEI is illustrated in Tables 2 and 3, respectively, below. The information shown below may be included within the additional information in the PEI.

TABLE 2

| Information included within a short message indicator | |
| --- | --- |
| Bit Field | Short Message Indicator |
| 00 | Reserved |
| 01 | Only scheduling information for paging is present in DCI |
| 10 | Only short message is present in DCI |
| 11 | Both scheduling information for paging and short message are present in DCI |

TABLE 3

| Information included within a short message | |
| --- | --- |
| Bit | Short Message |
| 1 | systemInfoModification<br>If set to 1: indication of a BCCH modification other than SIB6, SIB7 and SIB8. |

TABLE 3-continued

| Information included within a short message | |
| --- | --- |
| Bit | Short Message |
| 2 | etwsAndCmasIndication<br>If set to 1: indication of an ETWS primary notification and/or an ETWS secondary notification and/or a CMAS notification. |
| 3 | stopPagingMonitoring<br>If set to 1: stop monitoring PDCCH occasions(s) for paging in this PO. |
| 4-8 | Not used in this release of the specification and shall be ignored by UE if received. |

FIG. 8 depicts a process 800 for wireless communication. By way of example, a UE (e.g., such as the UE 104 in the wireless communication network 100), or a portion thereof, may perform, or be configured, operable, or adapted to perform, operations of the process 800 for receiving additional information in a PEI. By way of another example, operations of the process 800 may be implemented as software components that are executed and run on one or more processors (e.g., controller/processor 280 of FIG. 2). Signals involved in the operations may be transmitted or received by the UE by one or more antennas (e.g., antennas 252 of FIG. 2), or via a bus interface of one or more processors (e.g., the controller/processor 280) obtaining and/or outputting the signals.

Process 800 begins at block 802 by determining a set of paging cycles for receiving paging information from a base station (BS).

At block 804, the UE receives a paging early indicator (PEI) from the BS. In some cases, the PEI includes an indication to the UE whether the paging information will be transmitted in one or more paging cycles of the set of paging cycles. In some cases, the PEI also includes additional information related to receiving the paging information.

At block 806, the UE receives the paging information in the one or more paging cycles indicated by the PEI.

In some cases, the additional information related to receiving the paging information includes an indication of a cycle length of the one or more paging cycles to receive the paging information and receiving the paging information is based on the indication of the cycle length.

In some cases, the additional information related to receiving the paging information comprises a flag that indicates one paging cycle of a defined group of paging cycles for receiving the paging information. In this case, the UE may further receive signaling from the BS including configuration information configuring the defined group of paging cycles. In some cases, the signaling including the configuration information configuring the defined group of paging cycles is received in at least one of a system information block (SIB) or a radio resource control (RRC) release message. In some cases, receiving the paging information in the one or more paging cycles comprises receiving the paging information in the one paging cycle of the defined group of paging cycles indicated by the flag.

In some cases, the additional information related to receiving the paging information comprises a short message indicator, indicating whether the UE should receive the paging information in the one or more paging cycles or a short message. In some cases, the additional information related to receiving the paging information comprises a short message. In some cases, the additional information related to receiving the paging information comprises both the short indicator and the short message. The short message may comprise an indication of whether the UE should receive updated system information or an Earthquake and Tsunami Warning System (ETWS) message.

FIG. 9 depicts a process 900 for wireless communication. By way of example, a BS (e.g., such as the BS 102 in the wireless communication network 100), or a portion thereof, may perform, or be configured, operable, or adapted to perform, operations of the process 900 for providing additional information in a PEI. By way of another example, operations of the process 900 may be implemented as software components that are executed and run on one or more processors (e.g., controller/processor 240 of FIG. 2). Signals involved in the operations may be transmitted or received by the BS by one or more antennas (e.g., antennas 234 of FIG. 2), or via a bus interface of one or more processors (e.g., the controller/processor 240) obtaining and/or outputting the signals.

Process 900 begins at block 902 by determining a set of paging cycles for transmitting paging information to a user equipment (UE).

At block 904, the BS transmits a paging early indicator (PEI) to the UE. In some cases, the PEI includes an indication to the UE whether the paging information will be transmitted in one or more paging cycles of the set of paging cycles. In some cases, the PEI also includes additional information related to receiving the paging information.

At block 906, the BS transmits the paging information in the one or more paging cycles indicated by the PEI.

In some cases, the additional information related to receiving the paging information includes an indication of a cycle length of the one or more paging cycles to receive the paging information and receiving the paging information is based on the indication of the cycle length.

In some cases, the additional information related to receiving the paging information comprises a flag that indicates one paging cycle of a defined group of paging cycles for receiving the paging information. In this case, the UE may further receive transmitting signaling to the UE including configuration information configuring the defined group of paging cycles. In some cases, the signaling including the configuration information configuring the defined group of paging cycles is transmitted in at least one of a system information block (SIB) or a radio resource control (RRC) release message. In some cases, transmitting the paging information in the one or more paging cycles comprises transmitting the paging information in the one paging cycle of the defined group of paging cycles indicated by the flag.

In some cases, the additional information related to receiving the paging information comprises a short message indicator, indicating whether the UE should receive the paging information in the one or more paging cycles or a short message. In some cases, the additional information related to receiving the paging information comprises a short message. In some cases, the additional information related to receiving the paging information comprises both the short indicator and the short message. The short message may comprise an indication of whether the UE should receive updated system information or an Earthquake and Tsunami Warning System (ETWS) message.

Additional Considerations Regarding Legacy Paging and a PEI Indicating Paging Information Will be Transmitted In some cases, when the BS transmits a PEI to UE to indicate whether paging information will be transmitted to the UE, the BS may still or may not indicate whether the paging information will be transmitted via legacy paging PDCCH and legacy paging PDSCH. There are benefits for both using and not using the conventional approach. For example, if conventional paging is not used, the BS can save more signaling and power overhead. If conventional paging is used, such paging may increase robustness of the paging signaling.

In some cases, when a PEI is transmitted, the UE may need to determine whether to expect transmission of a conventional paging PDCCH and/or a legacy paging PDSCH. For example, in some cases, the UE may determine a set of paging cycles for receiving paging information from BS. Thereafter, the UE may receive a PEI from the BS indicating whether the UE should receive the paging information in one or more paging cycles of the set of paging cycles. In some cases, the PEI may provide an explicit or implicit indication related to at least one of a legacy paging PDCCH or legacy paging PDSCH. In some cases, the legacy paging PDCCH may comprise DCI format 1_0 that is scrambled by paging radio network temporary identifier (P-RNTI). In some cases, the legacy paging PDSCH is the PDSCH scheduled by the legacy paging PDCCH.

Thereafter, in some cases, the UE may take one or more actions based on the indication related to at least one of the legacy PDCCH or the legacy PDSCH. For example, in some cases, taking the one or more actions comprises monitoring for and receiving at least one of the legacy paging PDCCH or legacy paging PDSCH in the one or more paging cycles based on the indication related to at least one of the legacy paging PDCCH or the legacy paging PDSCH. Alternatively, in some cases, taking the one or more actions comprises refraining from monitoring for at least one of the legacy paging PDCCH or legacy paging PDSCH in the one or more paging cycles based on the indication related to at least one of the legacy paging PDCCH or the legacy paging PDSCH.

More specifically, in some cases, if the PEI indicates that paging information will be not transmitted in the one or more paging cycles, the BS may refrain from transmitting the legacy paging PDCCH and/or legacy paging PDSCH in the one or more paging cycles. In this case, the PEI may provide an explicit indication to the UE to not expect that the BS transmits the legacy paging PDCCH and/or legacy paging PDSCH in the one or more paging cycles (e.g., to indicate that paging information will be transmitted to the UE in the one or more paging cycles). Additionally, in such cases, the UE may refrain from monitoring for the legacy PDCCH in the one or more paging cycles indicated by the PEI based on the explicit indication related to the legacy PDCCH Alternatively, the BS may still transmit the legacy paging PDCCH or legacy paging PDSCH in the one or more paging cycles to indicate that paging information will be transmitted in the one or more paging cycles. In this case, the PEI may provide an explicit indication to the UE to expect that the BS transmits the legacy paging PDCCH or legacy paging PDSCH in the one or more paging cycles to indicate that paging information will be transmitted to the UE in the one or more paging cycles. Additionally, in such cases, the UE may monitor for the legacy paging PDCCH and/or paging PDSCH in the one or more paging cycles indicated by the PEI based on the indication related to the legacy paging PDCCH and/or legacy paging PDSCH.

In some cases, the PEI provides an implicit indication (e.g., as opposed to an explicit indication carried within the PEI itself) related to at least one of the legacy paging PDCCH or legacy paging PDSCH based on configuration information transmitted by the BS to the UE indicating how to interpret the indication related to at least one of the legacy paging PDCCH or legacy paging PDSCH. In other words, the BS may transmit configuration information to the UE that indicates to the UE that, when a PEI is received that indicates that paging information will be transmitted in the one or more paging cycles, the UE should implicitly expect that the legacy paging PDCCH or paging PDCCH is also transmitted in the one or more paging cycles or indicates that the UE should implicitly not expect that the legacy paging PDCCH or paging PDCCH is transmitted in the one or more paging cycles. In some cases, the BS may transmit the configuration information to the UE in at least one of paging configuration information, a SIB, a RRC release message, or the PEI.

In some cases, whether the UE should expect to receive the legacy paging PDCCH and/or the legacy paging PDSCH in the one or more paging cycles indicated by the PEI may depend on the additional information (e.g., as described above in relations to FIG. 8 and FIG. 9) that is included in the PEI. For example, in some cases, if the PEI includes additional information, such as information typically included in a legacy paging PDCCH or the additional information indicates the network does not transmit the legacy paging PDCCH, then the UE may not expect to receive a legacy paging PDCCH in the one or more paging cycles indicated by the PEI. In other cases, if the PEI includes does not include this additional information or the additional information indicates the network transmits the legacy paging PDCCH, then the UE may expect to receive a legacy paging PDCCH in the one or more paging cycles indicated by the PEI.

FIG. 10 depicts a process 1000 for wireless communication. By way of example, a UE (e.g., such as the UE 104 in the wireless communication network 100), or a portion thereof, may perform, or be configured, operable, or adapted to perform, operations of the process 1000 for determining whether to receive a legacy paging PDCCH and/or legacy paging PDCCH in response to a PEI. By way of another example, operations of the process 1000 may be implemented as software components that are executed and run on one or more processors (e.g., controller/processor 280 of FIG. 2). Signals involved in the operations may be transmitted or received by the UE by one or more antennas (e.g., antennas 252 of FIG. 2), or via a bus interface of one or more processors (e.g., the controller/processor 280) obtaining and/or outputting the signals.

Process 1000 begins at block 1002 by determining a set of paging cycles for receiving paging information from a base station (BS).

At block 1004, the UE receives a paging early indicator (PEI) from the BS indicating whether the UE should receive the paging information in one or more paging cycles of the set of paging cycles. In some cases, the PEI provides an indication related to at least one of a legacy paging physical downlink control channel (PDCCH) or a legacy paging physical downlink shared channel (PDSCH).

At block 1006, the UE takes one or more actions based on the indication related to at least one of the legacy PDCCH or the legacy PDSCH.

In some cases, the PEI provides the indication related to the legacy paging PDCCH. Additionally, in some examples, the indication related to the legacy paging PDCCH indicates to the UE that the legacy paging PDCCH will not be transmitted in the one or more paging cycles indicated by the PEI. In such cases, taking the one or more actions comprises refraining from monitoring for and receiving the legacy PDCCH in the one or more paging cycles indicated by the PEI based on the indication related to the legacy PDCCH.

In some cases, the PEI provides the indication related to the legacy paging PDCCH and the indication related to the legacy paging PDCCH indicates to the UE that the legacy paging PDCCH will be transmitted in the one or more paging cycles indicated by the PEI. In this case, taking the one or more actions comprises monitoring for and receiving the legacy paging PDCCH in the one or more paging cycles indicated by the PEI based on the indication related to the legacy paging PDCCH.

In some cases, the PEI provides the indication related to at least one of the legacy paging PDCCH or legacy paging PDSCH based on configuration information transmitted to the UE indicating how to interpret the indication related to at least one of the legacy paging PDCCH or legacy paging PDSCH. The UE may receive the configuration information to the UE in at least one of paging configuration information, a system information block (SIB), a radio resource control (RRC) release message, or the PEI.

In some cases, taking the one or more actions comprises monitoring for and receiving at least one of the legacy paging PDCCH or legacy paging PDSCH in the one or more paging cycles based on the indication related to at least one of the legacy paging PDCCH or the legacy paging PDSCH. In other cases, taking the one or more actions comprises refraining from monitoring for at least one of the legacy paging PDCCH or legacy paging PDSCH in the one or more paging cycles based on the indication related to at least one of the legacy paging PDCCH or the legacy paging PDSCH.

FIG. 11 depicts a process 1100 for wireless communication. By way of example, a BS (e.g., such as the BS 102 in the wireless communication network 100), or a portion thereof, may perform, or be configured, operable, or adapted to perform, operations of the process 1100 for determining whether to transmit a legacy paging PDCCH or legacy paging PDCCH in response to a PEI. By way of another example, operations of the process 1100 may be implemented as software components that are executed and run on one or more processors (e.g., controller/processor 240 of FIG. 2). Signals involved in the operations may be transmitted or received by the BS by one or more antennas (e.g., antennas 234 of FIG. 2), or via a bus interface of one or more processors (e.g., the controller/processor 240) obtaining and/or outputting the signals.

Process 1100 begins at block 1102 by determining a set of paging cycles for transmitting paging information to a user equipment (UE).

At block 1104, the BS transmits a paging early indicator (PEI) to the UE indicating whether the UE should receive the paging information in one or more paging cycles of the set of paging cycles. In some cases, the PEI provides an indication related to at least one of a legacy paging physical downlink control channel (PDCCH) or a legacy paging physical downlink shared channel (PDSCH).

In some cases, the PEI provides the indication related to the legacy paging PDCCH and the indication related to the legacy paging PDCCH indicates to the UE that the legacy paging PDCCH will not be transmitted in the one or more paging cycles indicated by the PEI. In such cases, the BS may refrain from transmitting the legacy PDCCH in the one or more paging cycles indicated by the PEI based on the indication related to the legacy PDCCH.

In other cases, the PEI provides the indication related to the legacy paging PDCCH and the indication related to the legacy paging PDCCH indicates to the UE that the legacy paging PDCCH will be transmitted in the one or more paging cycles indicated by the PEI. Accordingly, in this case, the BS may further transmit the legacy PDCCH in the one or more paging cycles indicated by the PEI based on the indication related to the legacy PDCCH.

In some cases, the PEI provides the indication related to at least one of the legacy paging PDCCH or legacy paging PDSCH based on configuration information transmitted to the UE indicating how to interpret the indication related to at least one of the legacy paging PDCCH or legacy paging PDSCH. The BS may transmit the configuration information to the UE in at least one of paging configuration information, a system information block (SIB), a radio resource control (RRC) release message, or the PEI.

In some cases, the BS transmits at least one of the legacy paging PDCCH or legacy paging PDSCH in the one or more paging cycles based on the indication related to at least one of the legacy paging PDCCH or the legacy paging PDSCH. In other cases, the BS may refrain from transmitting at least one of the legacy paging PDCCH or legacy paging PDSCH in the one or more paging cycles based on the indication related to at least one of the legacy paging PDCCH or the legacy paging PDSCH.

Additional Considerations Regarding Legacy Paging and a PEI Indicating Paging Information Will not be Transmitted In some cases, when the BS transmits a PEI to a UE (e.g., which may be in an idle or inactive mode) indicating that paging information will not be transmitted to the UE in one or more paging cycles or when the UE does not receive a PEI for these one or more paging cycles, the UE may determine whether to receive a legacy paging PDCCH or refrain from receiving the legacy paging PDCCH. In some cases, the UE may be able to conserve power by refraining from receiving the legacy paging PDCCH.

Accordingly, for example, in some cases, the UE may determine a set of paging cycles for receiving paging information from a base station (BS). Further, the UE may detect at least one of a PEI indicating that the paging information will not be transmitted in one or more paging cycles of the set of paging cycles or that the PEI for one or more paging cycles of the set of paging cycles has not been received. The UE, which may be in an idle or inactive mode, may then take one or more actions related to a legacy paging PDCCH based on the detection.

For example, in some cases, taking the one or more actions may comprise receiving the legacy paging PDCCH in the one or more paging cycles of the set of paging cycles in a downlink control format 1_0 message. In other cases, taking the one or more actions may comprise refraining from receiving the legacy paging PDCCH in the one or more paging cycles of the set of paging cycles.

In some cases, whether the UE receives the legacy paging PDCCH or decides not to receive the legacy PDCCH (e.g., in response to detecting the PEI that indicates that the paging information will not be transmitted in the one or more paging cycles or in response to not detecting the PEI for the one or more paging cycles) may be based on configuration information received from a base station indicating the one or more actions to take related to the legacy paging PDCCH. In some cases, the configuration information may be received in at least one of system information (SIB), paging configuration information, a radio resource control (RRC) release message, or the PEI. In some cases, if received in SIB, the configuration information may semi-statically configure the UE to either receive the legacy PDCCH or refrain from receiving the legacy PDCCH. In some cases, if received in the PEI, the PEI may dynamically configure the UE with the configuration information regarding whether to receive the legacy PDCCH or refrain from receiving the legacy PDCCH.

Figure 12:
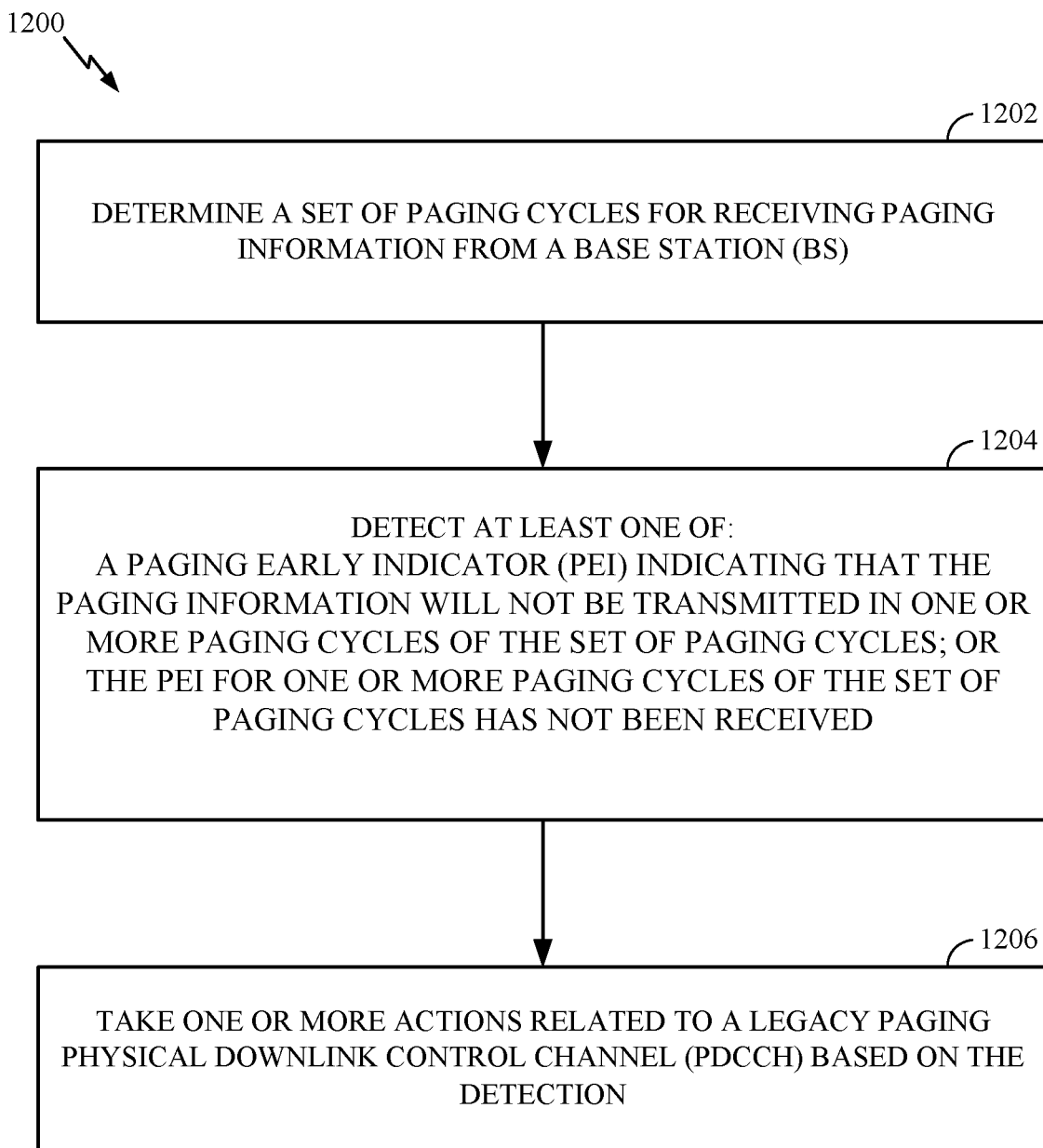
FIG. 12 is a flow diagram illustrating example operations for wireless communication by a UE, in accordance with certain aspects of the present disclosure.

FIG. 12 depicts a process 1200 for wireless communication. By way of example, a UE (e.g., such as the UE 104 in the wireless communication network 100), or a portion thereof, may perform, or be configured, operable, or adapted to perform, operations of the process 1200 for determining whether to receive a legacy paging PDCCH or legacy paging PDCCH in response to a PEI. By way of another example, operations of the process 1200 may be implemented as software components that are executed and run on one or more processors (e.g., controller/processor 280 of FIG. 2). Signals involved in the operations may be transmitted or received by the UE by one or more antennas (e.g., antennas 252 of FIG. 2), or via a bus interface of one or more processors (e.g., the controller/processor 280) obtaining and/or outputting the signals.

Process 1200 begins at block 1202 by determining a set of paging cycles for receiving paging information from a base station (BS).

At block 1204, the UE detects at least one of a paging early indicator (PEI) indicating that the paging information will not be transmitted in one or more paging cycles of the set of paging cycles or that the PEI for one or more paging cycles of the set of paging cycles has not been received.

At block 1206, the UE takes one or more actions related to a legacy paging physical downlink control channel (PDCCH) based on the detection.

In some cases, taking the one or more actions comprises receiving the legacy paging PDCCH in the one or more paging cycles of the set of paging cycles in a downlink control format 1_0 message. In other cases, taking the one or more actions may comprise refraining from receiving the legacy paging PDCCH in the one or more paging cycles of the set of paging cycles.

Additionally, in some cases, taking the one or more actions related to the legacy paging PDCCH is based on configuration information received from a base station indicating the one or more actions to take related to the legacy paging PDCCH. The configuration information may be received in at least one of system information (SIB), paging configuration information, a radio resource control (RRC) release message, or the PEI.

Example Wireless Communication Devices

Figure 13:
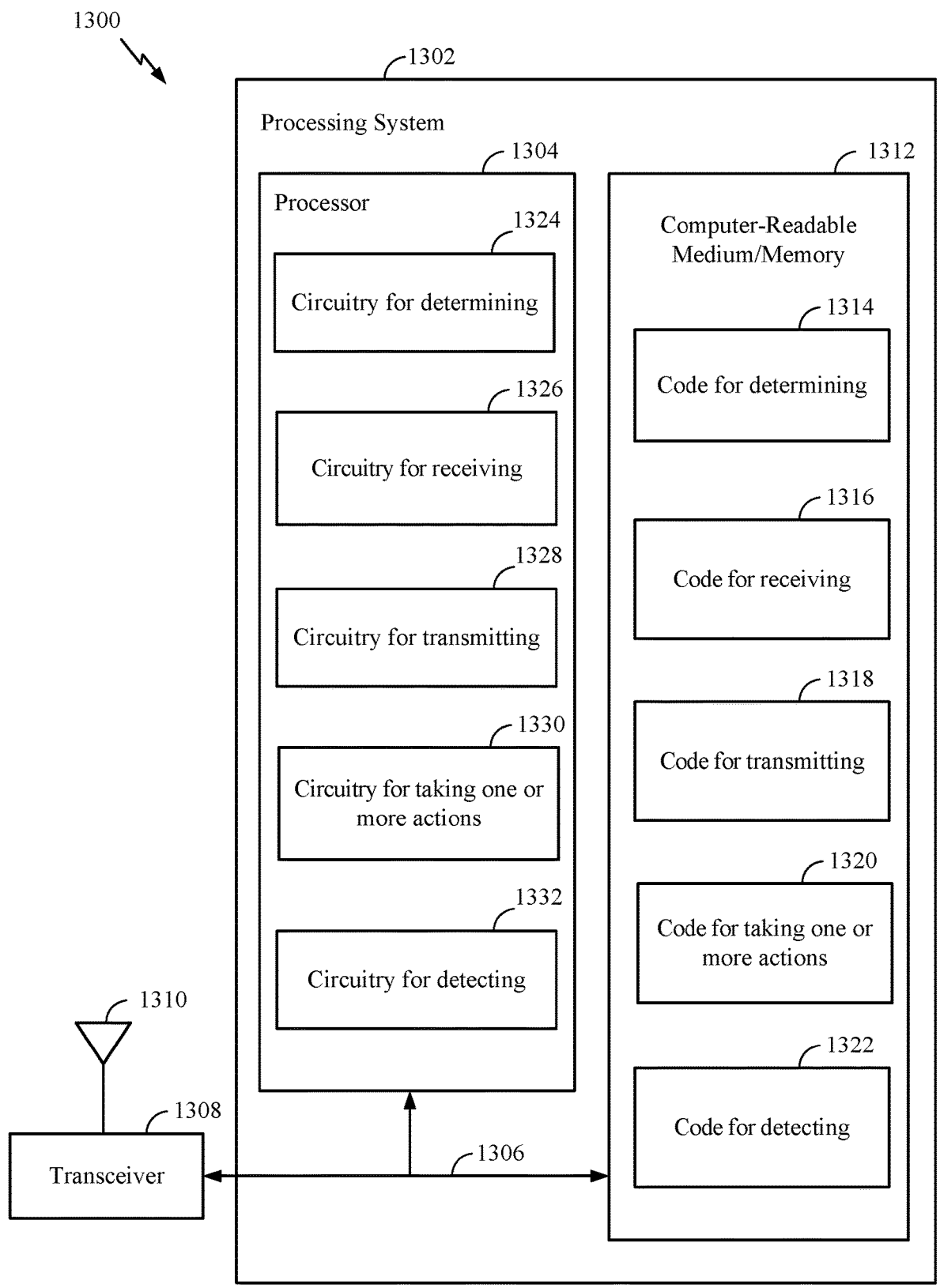
FIG. 13 illustrates an example wireless communications device, or part thereof, that is operable, configured, or adapted to perform operations for the methods disclosed herein, in accordance with certain aspects of the present disclosure.

FIG. 13 illustrates a communications device 1300 that may include various components operable, configured, or adapted to perform operations for the techniques disclosed herein, such as the operations illustrated in FIGS. 5, 8, 10, and 12.

Communications device 1300 includes a processing system 1302 coupled to a transceiver 1308 (e.g., a transmitter and/or a receiver). Transceiver 1308 is configured to transmit and receive signals for the communications device 1300 via an antenna 1310, such as the various signals as described herein. Processing system 1302 may be configured to perform processing functions for communications device 1300, including processing signals received and/or to be transmitted by communications device 1300. The transceiver 608 can include one or more components of UE 104 with reference to FIG. 2 such as, for example, transceiver 254, TX MIMO processor 266, transmit processor 264, receive processor 258, MIMO detector 256, and/or the like.

Processing system 1302 includes a processor 1304 coupled to a computer-readable medium/memory 1312 via a bus 1306. In certain aspects, computer-readable medium/memory 1312 is configured to store instructions (e.g., computer-executable code) that when executed by processor 1304, cause processor 1304 to perform the operations illustrated in FIGS. 5, 8, 10, and 12, or other operations for performing the various techniques discussed herein for paging based on a paging early indicator (PEI). In some cases, the processor 1304 can include one or more components of UE 104 with reference to FIG. 2 such as, for example, controller/processor 280 (including the PEI component 281), transmit processor 264, receive processor 258, and/or the like. Additionally, in some cases, the computer-readable medium/memory 612 can include one or more components of UE 104 with reference to FIG. 2 such as, for example, memory 282 and/or the like.

In certain aspects, computer-readable medium/memory 1312 stores code 1314 for determining, code 1316 for receiving, code 1318 for transmitting, code 1320 for taking one or more actions, and code 1322 for detecting.

In some cases, code 1314 for determining includes code for determining a set of paging cycles for receiving paging information from a base station (BS).

In some cases, code 1316 for receiving includes code for receiving a first paging early indicator (PEI) from the BS in a first paging cycle of the set of paging cycles, wherein the first PEI indicates whether the paging information will be transmitted to the UE in one or more second paging cycles of the set of paging cycles occurring after the first paging cycle.

In some cases, code 1316 for receiving includes code for receiving the paging information in the one or more second paging cycles based on the first PEI received in the first paging cycle.

In some cases, code 1314 for determining includes code for determining at least one of a number of synchronization signal block (SSB) bursts to receive or number of reference signal (RS) occasions to receive within the one or more paging cycles before receiving the paging information.

In some cases, code 1316 for receiving includes code for not receiving a second PEI in the one or more second paging cycles indicated by the first PEI.

In some cases, code 1316 for receiving includes code for receiving the paging information in the one or more second paging cycles based on a paging starting configuration.

In some cases, code 1318 for transmitting includes code for transmitting an indication of a preference of the UE to the BS in a report that indicates a paging delay threshold of the UE associated with the first PEI.

In some cases, code 1316 for receiving includes code for receiving a paging early indicator (PEI) from the BS, wherein the PEI includes: an indication to the UE whether the paging information will be transmitted in one or more paging cycles of the set of paging cycles and additional information related to receiving the paging information.

In some cases, code 1316 for receiving includes code for receiving the paging information in the one or more paging cycles indicated by the PEI.

In some cases, code 1316 for receiving includes code for receiving the paging information is based on the indication of a cycle length.

In some cases, code 1316 for receiving includes code for receiving signaling from the BS including configuration information configuring a defined group of paging cycles.

In some cases, code 1316 for receiving includes code for receiving the paging information in the one paging cycle of the defined group of paging cycles indicated by a flag in the PEI.

In some cases, code 1316 for receiving includes code for receiving a paging early indicator (PEI) from the BS indicating whether the UE should receive the paging information in one or more paging cycles of the set of paging cycles, wherein the PEI provides an indication related to at least one of a legacy paging physical downlink control channel (PDCCH) or a legacy paging physical downlink shared channel (PDSCH).

In some cases, code 1320 for taking one or more actions includes code for taking one or more actions based on the indication related to at least one of the legacy PDCCH or the legacy PDSCH.

In some cases, code 1320 for taking one or more actions includes code for refraining from monitoring for and receiving the legacy PDCCH in the one or more paging cycles indicated by the PEI based on the indication related to the legacy PDCCH.

In some cases, code 1320 for taking one or more actions includes code for monitoring for and receiving the legacy paging PDCCH in the one or more paging cycles indicated by the PEI based on the indication related to the legacy paging PDCCH.

In some cases, code 1320 for taking one or more actions includes code for monitoring for and receiving at least one of the legacy paging PDCCH or legacy paging PDSCH in the one or more paging cycles based on the indication related to at least one of the legacy paging PDCCH or the legacy paging PDSCH.

In some cases, code 1320 for taking one or more actions includes code for refraining from monitoring for at least one of the legacy paging PDCCH or legacy paging PDSCH in the one or more paging cycles based on the indication related to at least one of the legacy paging PDCCH or the legacy paging PDSCH.

In some cases, code 1322 for detecting includes code for detecting at least one of a paging early indicator (PEI) indicating that the paging information will not be transmitted in one or more paging cycles of the set of paging cycles or that the PEI for one or more paging cycles of the set of paging cycles has not been received.

In some cases, code 1320 for taking one or more actions includes code for taking one or more actions related to a legacy paging physical downlink control channel (PDCCH) based on the detection.

In some cases, code 1320 for taking one or more actions includes code for receiving the legacy paging PDCCH in the one or more paging cycles of the set of paging cycles in a downlink control format 1_0 message.

In some cases, code 1320 for taking one or more actions includes code for refraining from receiving the legacy paging PDCCH in the one or more paging cycles of the set of paging cycles.

Processor 1304 has circuitry configured to implement the code stored in the computer-readable medium/memory 1312. For example, processor 1304 includes circuitry 1324 for determining, circuitry 1326 for receiving, circuitry 1328 for transmitting, circuitry 1330 for taking one or more actions, and circuitry 1332 for detecting.

In some cases, circuitry 1324 for determining includes circuitry for determining a set of paging cycles for receiving paging information from a base station (BS).

In some cases, circuitry 1326 for receiving includes circuitry for receiving a first paging early indicator (PEI)

from the BS in a first paging cycle of the set of paging cycles, wherein the first PEI indicates whether the paging information will be transmitted to the UE in one or more second paging cycles of the set of paging cycles occurring after the first paging cycle.

In some cases, circuitry 1326 for receiving includes circuitry for receiving the paging information in the one or more second paging cycles based on the first PEI received in the first paging cycle.

In some cases, circuitry 1324 for determining includes circuitry for determining at least one of a number of synchronization signal block (SSB) bursts to receive or number of reference signal (RS) occasions to receive within the one or more paging cycles before receiving the paging information.

In some cases, circuitry 1326 for receiving includes circuitry for not receiving a second PEI in the one or more second paging cycles indicated by the first PEI.

In some cases, circuitry 1326 for receiving includes circuitry for receiving the paging information in the one or more second paging cycles based on a paging starting configuration.

In some cases, circuitry 1328 for transmitting includes circuitry for transmitting an indication of a preference of the UE to the BS in a report that indicates a paging delay threshold of the UE associated with the first PEI.

In some cases, circuitry 1326 for receiving includes circuitry for receiving a paging early indicator (PEI) from the BS, wherein the PEI includes: an indication to the UE whether the paging information will be transmitted in one or more paging cycles of the set of paging cycles and additional information related to receiving the paging information.

In some cases, circuitry 1326 for receiving includes circuitry for receiving the paging information in the one or more paging cycles indicated by the PEI.

In some cases, circuitry 1326 for receiving includes circuitry for receiving the paging information is based on the indication of a cycle length.

In some cases, circuitry 1326 for receiving includes circuitry for receiving signaling from the BS including configuration information configuring a defined group of paging cycles.

In some cases, circuitry 1326 for receiving includes circuitry for receiving the paging information in the one paging cycle of the defined group of paging cycles indicated by a flag in the PEI.

In some cases, circuitry 1326 for receiving includes circuitry for receiving a paging early indicator (PEI) from the BS indicating whether the UE should receive the paging information in one or more paging cycles of the set of paging cycles, wherein the PEI provides an indication related to at least one of a legacy paging physical downlink control channel (PDCCH) or a legacy paging physical downlink shared channel (PDSCH).

In some cases, circuitry 1330 for taking one or more actions includes circuitry for taking one or more actions based on the indication related to at least one of the legacy PDCCH or the legacy PDSCH.

In some cases, circuitry 1330 for taking one or more actions includes circuitry for refraining from monitoring for and receiving the legacy PDCCH in the one or more paging cycles indicated by the PEI based on the indication related to the legacy PDCCH.

In some cases, circuitry 1330 for taking one or more actions includes circuitry for monitoring for and receiving the legacy paging PDCCH in the one or more paging cycles indicated by the PEI based on the indication related to the legacy paging PDCCH.

In some cases, circuitry 1330 for taking one or more actions includes circuitry for monitoring for and receiving at least one of the legacy paging PDCCH or legacy paging PDSCH in the one or more paging cycles based on the indication related to at least one of the legacy paging PDCCH or the legacy paging PDSCH.

In some cases, circuitry 1330 for taking one or more actions includes circuitry for refraining from monitoring for at least one of the legacy paging PDCCH or legacy paging PDSCH in the one or more paging cycles based on the indication related to at least one of the legacy paging PDCCH or the legacy paging PDSCH.

In some cases, circuitry 1332 for detecting includes circuitry for detecting at least one of a paging early indicator (PEI) indicating that the paging information will not be transmitted in one or more paging cycles of the set of paging cycles or that the PEI for one or more paging cycles of the set of paging cycles has not been received.

In some cases, circuitry 1330 for taking one or more actions includes circuitry for taking one or more actions related to a legacy paging physical downlink control channel (PDCCH) based on the detection.

In some cases, circuitry 1330 for taking one or more actions includes circuitry for receiving the legacy paging PDCCH in the one or more paging cycles of the set of paging cycles in a downlink control format 1_0 message.

In some cases, circuitry 1330 for taking one or more actions includes circuitry for refraining from receiving the legacy paging PDCCH in the one or more paging cycles of the set of paging cycles.

In some cases, the operations illustrated in FIGS. 5, 8, 10, and 12, as well as other operations described herein for paging based on a PEI, may be implemented by one or means-plus-function components. For example, in some cases, such operations may be implemented by means for transmitting (or means for outputting for transmission), means for receiving (or means for obtaining), means for determining, means for taking one or more actions, and means for detecting.

In some cases, means for transmitting (or means for outputting for transmission) includes the transceiver 254 and/or antenna(s) 252 of the UE 104 illustrated in FIG. 2 and/or circuitry 1328 for transmitting of the communication device 1300 in FIG. 13.

In some cases, means for receiving (or means for obtaining) includes the receiver and/or antenna(s) 252 of the UE 104 illustrated in FIG. 2 and/or circuitry 1326 for receiving of the communication device 1300 in FIG. 13.

In some cases, means for determining, means for taking one or more actions, and means for detecting, includes a processing system, which may include one or more processors, such as the receive processor 258, the transmit processor 264, the TX MIMO processor 266, and/or the controller/processor 280 of the UE 104 illustrated in FIG. 2 and/or the processing system 1302 of the communication device 1300 in FIG. 13.

Figure 14:
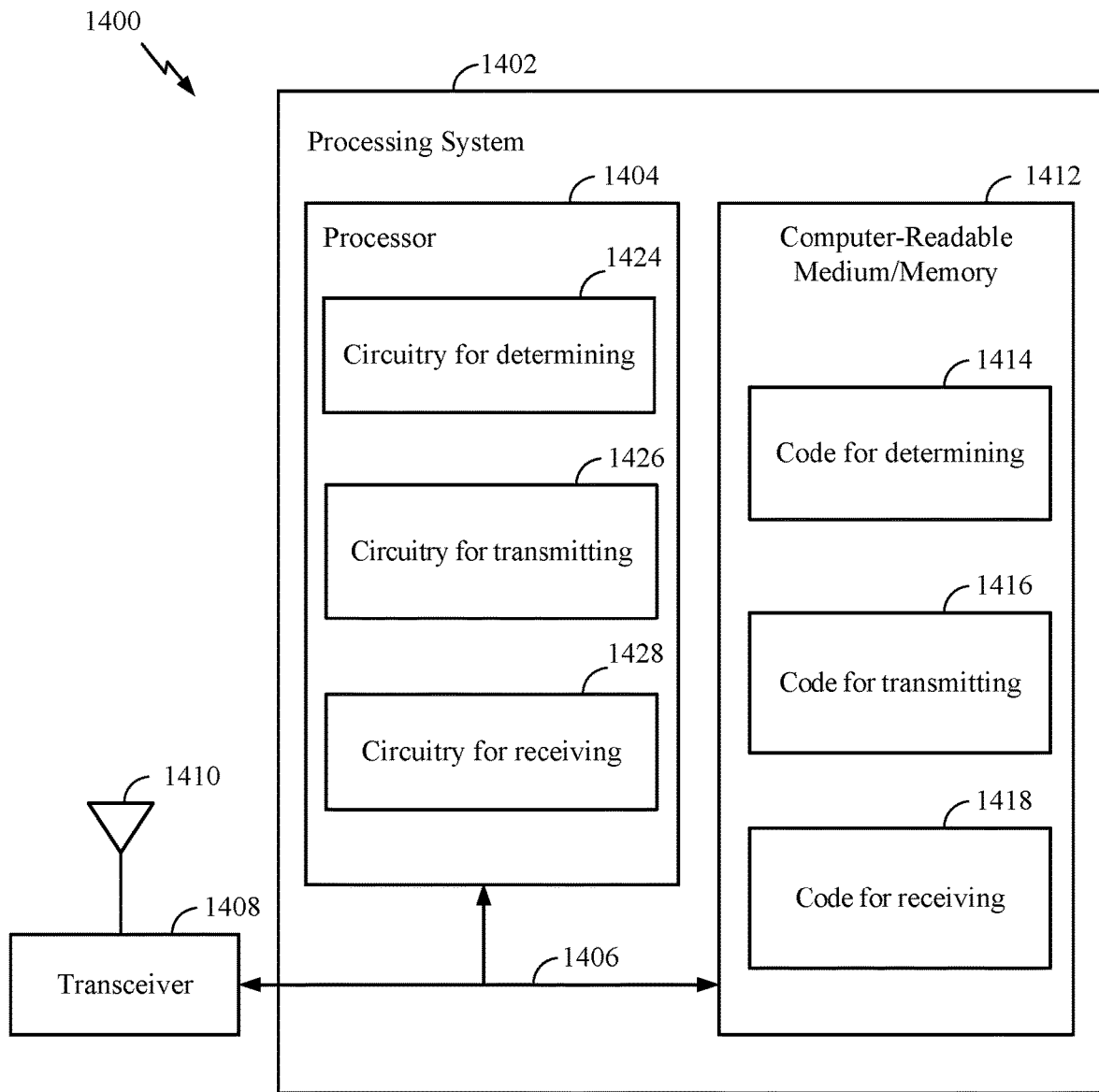
FIG. 14 illustrates an example wireless communications device, or part thereof, that is operable, configured, or adapted to perform operations for the methods disclosed herein, in accordance with certain aspects of the present disclosure.

FIG. 14 illustrates a communications device 1400 that includes various components operable, configured, or adapted to perform operations for the techniques disclosed herein, such as the operations illustrated in FIGS. 6, 9, and 11.

Communications device 1400 includes a processing system 1402 coupled to a transceiver 1408 (e.g., a transmitter and/or a receiver). Transceiver 1408 is configured to transmit and receive signals for the communications device 1400 via an antenna 1410, such as the various signals as described herein. Processing system 1402 may be configured to perform processing functions for communications device 1400, including processing signals received and/or to be transmitted by communications device 1400. The transceiver 708 can include one or more components of BS 102 with reference to FIG. 2 such as, for example, transceiver 232, TX MIMO processor 230, transmit processor 220, receive processor 238, MIMO detector 236, and/or the like.

Processing system 1402 includes a processor 1404 coupled to a computer-readable medium/memory 1412 via a bus 1406. In certain aspects, computer-readable medium/memory 1412 is configured to store instructions (e.g., computer-executable code) that when executed by processor 1404, cause processor 1404 to perform the operations illustrated in FIGS. 6, 9, and 11, or other operations for performing the various techniques discussed herein for paging based on a paging early indicator (PEI). In some cases, the processor 704 can include one or more components of BS 102 with reference to FIG. 2 such as, for example, controller/processor 240 (including the PEI component 241), transmit processor 220, receive processor 238, and/or the like. Additionally, in some cases, the computer-readable medium/memory 712 can include one or more components of BS 102 with reference to FIG. 2 such as, for example, memory 242 and/or the like.

In certain aspects, computer-readable medium/memory 1412 stores code 1414 for determining, code 1416 for transmitting, and code 1418 for receiving.

In some cases, code 1414 for determining includes code for determining a set of paging cycles for transmitting paging information to a user equipment (UE).

In some cases, code 1416 for transmitting includes code for transmitting a first paging early indicator (PEI) to the UE in a first paging cycle of the set of paging cycles, wherein the first PEI indicates whether the paging information will be transmitted to the UE in one or more second paging cycles of the set of paging cycles occurring after the first paging cycle.

In some cases, code 1416 for transmitting includes code for transmitting the paging information in the one or more second paging cycles indicated by the first PEI.

In some cases, code 1416 for transmitting includes code for refraining from transmitting a second PEI in the one or more second paging cycles indicated by the first PEI.

In some cases, code 1418 for receiving includes code for receiving an indication of the preference from the UE in a report that indicates a paging delay threshold of the UE associated with the first PEI.

In some cases, code 1416 for transmitting includes code for transmitting a paging early indicator (PEI) to the UE, wherein the PEI includes an indication to the UE whether paging information will be transmitted in one or more paging cycles of the set of paging cycles and additional information related to receiving the paging information.

In some cases, code 1416 for transmitting includes code for transmitting the paging information in the one or more paging cycles indicated by the PEI.

In some cases, code 1416 for transmitting includes code for transmitting the paging information based on an indication of a cycle length.

In some cases, code 1416 for transmitting includes code for transmitting signaling to the UE including configuration information configuring the defined group of paging cycles.

In some cases, code 1416 for transmitting includes code for transmitting the paging information in the one paging cycle of the defined group of paging cycles indicated by the flag.

In some cases, code 1416 for transmitting includes code for transmitting a paging early indicator (PEI) to the UE indicating whether the UE should receive the paging information in one or more paging cycles of the set of paging cycles, wherein the PEI provides an indication related to at least one of a legacy paging physical downlink control channel (PDCCH) or a legacy paging physical downlink shared channel (PDSCH).

In some cases, code 1416 for transmitting includes code for refraining from transmitting the legacy PDCCH in the one or more paging cycles indicated by the PEI based on the indication related to the legacy PDCCH.

In some cases, code 1416 for transmitting includes code for transmitting the legacy PDCCH in the one or more paging cycles indicated by the PEI based on the indication related to the legacy PDCCH.

In some cases, code 1416 for transmitting includes code for transmitting the configuration information to the UE (e.g., indicating how to interpret the indication related to at least one of the legacy paging PDCCH or legacy paging PDSCH) in at least one of paging configuration information, a system information block (SIB), a radio resource control (RRC) release message, or the PEI.

In some cases, code 1416 for transmitting includes code for transmitting at least one of the legacy paging PDCCH or legacy paging PDSCH in the one or more paging cycles based on the indication related to at least one of the legacy paging PDCCH or the legacy paging PDSCH.

In some cases, code 1416 for transmitting includes code for refraining from transmitting at least one of the legacy paging PDCCH or legacy paging PDSCH in the one or more paging cycles based on the indication related to at least one of the legacy paging PDCCH or the legacy paging PDSCH.

In certain aspects, processor 1404 has circuitry configured to implement the code stored in the computer-readable medium/memory 1412. For example, processor 1404 includes circuitry 1424 for determining, circuitry 1426 for transmitting, and circuitry 1428 for receiving.

In some cases, circuitry 1424 for determining includes circuitry for determining a set of paging cycles for transmitting paging information to a user equipment (UE).

In some cases, circuitry 1426 for transmitting includes circuitry for transmitting a first paging early indicator (PEI) to the UE in a first paging cycle of the set of paging cycles, wherein the first PEI indicates whether the paging information will be transmitted to the UE in one or more second paging cycles of the set of paging cycles occurring after the first paging cycle.

In some cases, circuitry 1426 for transmitting includes circuitry for transmitting the paging information in the one or more second paging cycles indicated by the first PEI.

In some cases, circuitry 1426 for transmitting includes circuitry for refraining from transmitting a second PEI in the one or more second paging cycles indicated by the first PEI.

In some cases, circuitry 1428 for receiving includes circuitry for receiving an indication of the preference from the UE in a report that indicates a paging delay threshold of the UE associated with the first PEI.

In some cases, circuitry 1426 for transmitting includes circuitry for transmitting a paging early indicator (PEI) to the UE, wherein the PEI includes an indication to the UE whether paging information will be transmitted in one or more paging cycles of the set of paging cycles and additional information related to receiving the paging information.

In some cases, circuitry 1426 for transmitting includes circuitry for transmitting the paging information in the one or more paging cycles indicated by the PEI.

In some cases, circuitry 1426 for transmitting includes circuitry for transmitting the paging information based on an indication of a cycle length.

In some cases, circuitry 1426 for transmitting includes circuitry for transmitting signaling to the UE including configuration information configuring the defined group of paging cycles.

In some cases, circuitry 1426 for transmitting includes circuitry for transmitting the paging information in the one paging cycle of the defined group of paging cycles indicated by the flag.

In some cases, circuitry 1426 for transmitting includes circuitry for transmitting a paging early indicator (PEI) to the UE indicating whether the UE should receive the paging information in one or more paging cycles of the set of paging cycles, wherein the PEI provides an indication related to at least one of a legacy paging physical downlink control channel (PDCCH) or a legacy paging physical downlink shared channel (PDSCH).

In some cases, circuitry 1426 for transmitting includes circuitry for refraining from transmitting the legacy PDCCH in the one or more paging cycles indicated by the PEI based on the indication related to the legacy PDCCH.

In some cases, circuitry 1426 for transmitting includes circuitry for transmitting the legacy PDCCH in the one or more paging cycles indicated by the PEI based on the indication related to the legacy PDCCH.

In some cases, circuitry 1426 for transmitting includes circuitry for transmitting the configuration information to the UE (e.g., indicating how to interpret the indication related to at least one of the legacy paging PDCCH or legacy paging PDSCH) in at least one of paging configuration information, a system information block (SIB), a radio resource control (RRC) release message, or the PEI.

In some cases, circuitry 1426 for transmitting includes circuitry for transmitting at least one of the legacy paging PDCCH or legacy paging PDSCH in the one or more paging cycles based on the indication related to at least one of the legacy paging PDCCH or the legacy paging PDSCH.

In some cases, circuitry 1426 for transmitting includes circuitry for refraining from transmitting at least one of the legacy paging PDCCH or legacy paging PDSCH in the one or more paging cycles based on the indication related to at least one of the legacy paging PDCCH or the legacy paging PDSCH.

In some cases, the operations illustrated in FIGS. 5, 8, 10, and 12, as well as other operations described herein for paging based on a PEI, may be implemented by one or means-plus-function components. For example, in some cases, such operations may be implemented by means for transmitting (or means for outputting for transmission), means for receiving (or means for obtaining), and means for determining.

In some cases, means for transmitting (or means for outputting for transmission) includes a transmitter and/or an antenna(s) 234 or the BS 102 illustrated in FIG. 2 and/or circuitry 1426 for transmitting of the communication device 1400 in FIG. 14.

In some cases, means for receiving (or means for obtaining) includes a receiver and/or an antenna(s) 234 of the BS 102 illustrated in FIG. 2 and/or circuitry 1428 for receiving of the communication device 1400 in FIG. 14.

In some cases, means for determining includes a processing system, which may include one or more processors, such as the transmit processor 220, the TX MIMO processor 230, the receive processor 238, and/or the controller/processor 240 of the BS 102 illustrated in FIG. 2 and/or the processing system 1402 of the communication device 1400 in FIG. 14.

EXAMPLE CLAUSES

Implementation examples are described in the following numbered clauses:

Clause 1: A method for wireless communication by a base station (BS), comprising: determining a set of paging cycles for transmitting paging information to a user equipment (UE); transmitting a first paging early indicator (PEI) to the UE in a first paging cycle of the set of paging cycles, wherein the first PEI indicates whether the paging information will be transmitted to the UE in one or more second paging cycles of the set of paging cycles occurring after the first paging cycle; and transmitting the paging information in the one or more second paging cycles indicated by the first PEI.

Clause 2: The method of Clause 1, wherein the first PEI is transmitted within a paging occasion associated with the UE in the first paging cycle.

Clause 3: The method of Clause 1, wherein the first PEI is transmitted within a time window occurring before, but within a threshold amount of time from, a paging occasion associated with the UE in the first paging cycle Clause 4: The method of any of Clauses 1-3, further comprising refraining from transmitting a second PEI in the one or more second paging cycles indicated by the first PEI.

Clause 5: The method of any of Clauses 1-4, wherein the first PEI is associated with a paging starting configuration.

Clause 6: The method of Clause 5, wherein the paging starting configuration indicates one of: that the paging information will be transmitted to the UE in the first paging cycle; a number of the one or more second paging cycles in which the paging information will be transmitted, wherein the number of the one or more second paging cycles starts from the first paging cycle; one specific paging cycle, from the set of paging cycles, occurring after the first paging cycle that the paging information will be transmitted in; or a number of the one or more second paging cycles in which the paging information will be transmitted, wherein the number of the one or more second starts from a paging cycle occurring after the first paging cycle.

Clause 7: The method of Clause 6, wherein: the paging starting configuration is based on a preference of the UE, and the method further comprises receiving an indication of the preference from the UE in a report that indicates a paging delay threshold of the UE associated with the first PEI.

Clause 8: The method of Clause 6, wherein: the paging starting configuration is based on a wireless communications standard and on a category associated with the UE; and the category associated with the UE indicates a paging delay threshold of the UE associated with the first PEI.

Clause 9: The method of Clause 6, wherein the paging starting configuration is semi-statically configured by the base station in one of paging configuration information, a system information block (SIB), or a radio resource connection (RRC) release message transmitted to the UE during a UE RRC release procedure.

Clause 10: The method of Clause 6, wherein the paging starting configuration is dynamically configured by the BS in the first PEI.

Clause 11: A method for wireless communication by a user equipment (UE), comprising: determining a set of paging cycles for receiving paging information from a base station (BS); receiving a first paging early indicator (PEI) from the BS in a first paging cycle of the set of paging cycles, wherein the first PEI indicates whether the paging information will be transmitted to the UE in one or more second paging cycles of the set of paging cycles occurring after the first paging cycle; and receiving the paging information in the one or more second paging cycles based on the first PEI received in the first paging cycle.

Clause 12: The method of Clause 11, wherein receiving the paging information in the one or more second paging cycles comprises determining at least one of a number of synchronization signal block (SSB) bursts to receive or a number of reference signal (RS) occasions to receive within the one or more second paging cycles before receiving the paging information.

Clause 13: The method of Clause 12, wherein determining at least one of the number of SSB bursts to receive or number of RS occasions to receive is based on downlink channel conditions associated with the UE.

Clause 14: The method of any of Clauses 12-13, wherein determining at least one of the number of SSB bursts to receive or the number of RS occasions to receive is based on a capability associated with the UE to receive and process the number of SSB bursts or RS occasions.

Clause 15: The method of any of Clauses 12-14, wherein at least one of the number of SSB bursts to receive or the number of RS occasions to receive is based on a type of physical channel over which the paging information is received.

Clause 16: The method of any of Clauses 11-15, wherein the first PEI is received within a paging occasion in the first paging cycle.

Clause 17: The method of any of Clauses 11-15, wherein the first PEI is received within a time window occurring before, but within a threshold amount of time from, a paging occasion in the first paging cycle.

Clause 18: The method of any of Clauses 11-17, further comprising not receiving a second PEI in the one or more second paging cycles indicated by the first PEI.

Clause 19: The method of any of Clauses 11-18, wherein: the first PEI is associated with a paging starting configuration, and receiving the paging information in the one or more second paging cycles is further based on the paging starting configuration.

Clause 20: The method of Clause 19, wherein the paging starting configuration indicates one of: that the paging information will be received in the first paging cycle; a number of the one or more second paging cycles in which the paging information will be received, wherein the number of the one or more second paging cycles starts from the first paging cycle; one specific paging cycle, from the set of paging cycles, occurring after the first paging cycle that the paging information will be received in; or a number of the one or more second paging cycles in which the paging information will be received, wherein the number of the one or more second starts from a paging cycle occurring after the first paging cycle.

Clause 21: The method of Clause 20, wherein: the paging starting configuration is based on a preference of the UE, and the method further comprises transmitting an indication of the preference to the BS in a report that indicates a paging delay threshold of the UE associated with the first PEI.

Clause 22: The method of any of Clauses 20-21, wherein: the paging starting configuration is based on a wireless communication standard and on a category associated with the UE, and the category associated with the UE indicates a paging delay threshold of the UE associated with the first PEI.

Clause 23: The method of any of Clauses 20-22, wherein the paging starting configuration is semi-statically configured by the base station in one of paging configuration information, a system information block (SIB), or a radio resource connection (RRC) release message transmitted to the UE during a UE RRC release procedure.

Clause 24: The method of any of Clauses 20-23, wherein the paging starting configuration is dynamically configured by the BS in the first PEI.

Clause 25: A method for wireless communication by a base station (BS), comprising: determining a set of paging cycles for transmitting paging information to a user equipment (UE); transmitting a paging early indicator (PEI) to the UE, wherein the PEI includes: an indication to the UE whether paging information will be transmitted in one or more paging cycles of the set of paging cycles; and additional information related to receiving the paging information; and transmitting the paging information in the one or more paging cycles indicated by the PEI.

Clause 26: The method of Clause 25, wherein: additional information related to receiving the paging information includes an indication of a cycle length of the one or more paging cycles to receive the paging information, and transmitting the paging information is based on the indication of the cycle length.

Clause 27: The method of any of Clauses 25-26, wherein the additional information related to receiving the paging information comprises a flag that indicates one paging cycle of a defined group of paging cycles for receiving the paging information.

Clause 28: The method of Clause 27, further comprising transmitting signaling to the UE including configuration information configuring the defined group of paging cycles.

Clause 29: The method of Clause 28, wherein the signaling including the configuration information configuring the defined group of paging cycles is transmitted in at least one of a system information block (SIB) or a radio resource control (RRC) release message.

Clause 30: The method of any of Clauses 27-29, wherein transmitting the paging information in the one or more paging cycles comprises transmitting the paging information in the one paging cycle of the defined group of paging cycles indicated by the flag.

Clause 31: The method of any of Clauses 25-30, wherein the additional information related to receiving the paging information comprises: a short message indicator, indicating whether the UE should receive the paging information in the one or more paging cycles, a short message in the PEI, or both the paging information and the short message.

Clause 32: The method of Clause 31, wherein the short message comprises an indication of whether the UE should receive updated system information or an Earthquake and Tsunami Warning System (ETWS) message.

Clause 33: A method for wireless communication by a user equipment (UE), comprising: determining a set of paging cycles for receiving paging information from a base station (BS); receiving a paging early indicator (PEI) from the BS, wherein the PEI includes: an indication to the UE whether the paging information will be transmitted in one or more paging cycles of the set of paging cycles; and additional information related to receiving the paging information; and receiving the paging information in the one or more paging cycles indicated by the PEI.

Clause 34: The method of Clause 33, wherein: additional information related to receiving the paging information includes an indication of a cycle length of the one or more paging cycles to receive the paging information; and receiving the paging information is based on the indication of the cycle length.

Clause 35: The method of any of Clauses 33-34, wherein the additional information related to receiving the paging information comprises a flag that indicates one paging cycle of a defined group of paging cycles for receiving the paging information.

Clause 36: The method of Clause 35, further comprising receiving signaling from the BS including configuration information configuring the defined group of paging cycles.

Clause 37: The method of Clause 36, wherein the signaling including the configuration information configuring the defined group of paging cycles is received in at least one of a system information block (SIB) or a radio resource control (RRC) release message.

Clause 38: The method of any of Clauses 35-37, wherein receiving the paging information in the one or more paging cycles comprises receiving the paging information in the one paging cycle of the defined group of paging cycles indicated by the flag.

Clause 39: The method of any of Clauses 33-38, wherein the additional information related to receiving the paging information comprises: a short message indicator, indicating whether the UE should receive the paging information in the one or more paging cycles, a short message in the PEI, or both the short message indicator and the short message.

Clause 40: The method of Clause 39, wherein the short message comprises an indication of whether the UE should receive updated system information or an Earthquake and Tsunami Warning System (ETWS) message.

Clause 41: A method for wireless communication by a base station (BS), comprising: determining a set of paging cycles for transmitting paging information to a user equipment (UE); transmitting a paging early indicator (PEI) to the UE indicating whether the UE should receive the paging information in one or more paging cycles of the set of paging cycles, wherein the PEI provides an indication related to at least one of a legacy paging physical downlink control channel (PDCCH) or a legacy paging physical downlink shared channel (PDSCH).

Clause 42: The method of Clause 41, wherein: the PEI provides the indication related to the legacy paging PDCCH, and the indication related to the legacy paging PDCCH indicates to the UE that the legacy paging PDCCH will not be transmitted in the one or more paging cycles indicated by the PEI.

Clause 43: The method of Clause 42, further comprising refraining from transmitting the legacy PDCCH in the one or more paging cycles indicated by the PEI based on the indication related to the legacy PDCCH.

Clause 44: The method of Clause 43, wherein: the PEI provides the indication related to the legacy paging PDCCH, and the indication related to the legacy paging PDCCH indicates to the UE that the legacy paging PDCCH will be transmitted in the one or more paging cycles indicated by the PEI.

Clause 45: The method of Clause 44, further comprising transmitting the legacy PDCCH in the one or more paging cycles indicated by the PEI based on the indication related to the legacy PDCCH.

Clause 46: The method of any of Clauses 41-45, wherein the PEI provides the indication related to at least one of the legacy paging PDCCH or legacy paging PDSCH based on configuration information transmitted to the UE indicating how to interpret the indication related to at least one of the legacy paging PDCCH or legacy paging PDSCH.

Clause 47: The method of Clause 46, further comprising transmitting the configuration information to the UE in at least one of paging configuration information, a system information block (SIB), a radio resource control (RRC) release message, or the PEI.

Clause 48: The method of any of Clauses 41-47, further comprising transmitting at least one of the legacy paging PDCCH or legacy paging PDSCH in the one or more paging cycles based on the indication related to at least one of the legacy paging PDCCH or the legacy paging PDSCH.

Clause 49: The method any of Clauses 41-47, further comprising refraining from transmitting at least one of the legacy paging PDCCH or legacy paging PDSCH in the one or more paging cycles based on the indication related to at least one of the legacy paging PDCCH or the legacy paging PDSCH.

Clause 50: A method for wireless communication by a user equipment (UE), comprising: determining a set of paging cycles for receiving paging information from a base station (BS); receiving a paging early indicator (PEI) from the BS indicating whether the UE should receive the paging information in one or more paging cycles of the set of paging cycles, wherein the PEI provides an indication related to at least one of a legacy paging physical downlink control channel (PDCCH) or a legacy paging physical downlink shared channel (PDSCH); and taking one or more actions based on the indication related to at least one of the legacy PDCCH or the legacy PDSCH.

Clause 51: The method of Clause 50, wherein: the PEI provides the indication related to the legacy paging PDCCH, and the indication related to the legacy paging PDCCH indicates to the UE that the legacy paging PDCCH will not be transmitted in the one or more paging cycles indicated by the PEI.

Clause 52: The method of Clause 51, wherein taking the one or more actions comprises refraining from monitoring for and receiving the legacy PDCCH in the one or more paging cycles indicated by the PEI based on the indication related to the legacy PDCCH.

Clause 53: The method of any of Clauses 50-52, wherein: the PEI provides the indication related to the legacy paging PDCCH, and the indication related to the legacy paging PDCCH indicates to the UE that the legacy paging PDCCH will be transmitted in the one or more paging cycles indicated by the PEI.

Clause 54: The method of Clause 53, wherein taking the one or more actions comprises monitoring for and receiving the legacy paging PDCCH in the one or more paging cycles indicated by the PEI based on the indication related to the legacy paging PDCCH.

Clause 55: The method of any of Clauses 50-54, wherein the PEI provides the indication related to at least one of the legacy paging PDCCH or legacy paging PDSCH based on configuration information transmitted to the UE indicating how to interpret the indication related to at least one of the legacy paging PDCCH or legacy paging PDSCH.

Clause 56: The method of Clause 55, further comprising receiving the configuration information to the UE in at least one of paging configuration information, a system information block (SIB), a radio resource control (RRC) release message, or the PEI.

Clause 57: The method of any of Clauses 50-56, wherein taking the one or more actions comprises monitoring for and receiving at least one of the legacy paging PDCCH or legacy paging PDSCH in the one or more paging cycles based on the indication related to at least one of the legacy paging PDCCH or the legacy paging PDSCH.

Clause 58: The method of any of Clauses 50-56, wherein taking the one or more actions comprises refraining from monitoring for at least one of the legacy paging PDCCH or legacy paging PDSCH in the one or more paging cycles based on the indication related to at least one of the legacy paging PDCCH or the legacy paging PDSCH.

Clause 59: A method for wireless communication by a user equipment (UE), comprising: determining a set of paging cycles for receiving paging information from a base station (BS); detecting at least one of: a paging early indicator (PEI) indicating that the paging information will not be transmitted in one or more paging cycles of the set of paging cycles; or the PEI for one or more paging cycles of the set of paging cycles has not been received; and taking one or more actions related to a legacy paging physical downlink control channel (PDCCH) based on the detection.

Clause 60: The method of Clause 59, wherein taking the one or more actions comprises receiving the legacy paging PDCCH in the one or more paging cycles of the set of paging cycles in a downlink control format 1_0 message.

Clause 61: The method of Clause 59, wherein taking the one or more actions comprises refraining from receiving the legacy paging PDCCH in the one or more paging cycles of the set of paging cycles.

Clause 62: The method of any of Clauses 59-61, wherein taking the one or more actions related to the legacy paging PDCCH is based on configuration information received from a base station indicating the one or more actions to take related to the legacy paging PDCCH.

Clause 63: The method of Clause 62, wherein the configuration information is received in at least one of system information (SIB), paging configuration information, a radio resource control (RRC) release message, or the PEI.

Clause 64: A processing system, comprising: a memory comprising computer-executable instructions; one or more processors configured to execute the computer-executable instructions and cause the processing system to perform a method in accordance with any one of Clauses 1-63.

Clause 65: A processing system, comprising means for performing a method in accordance with any one of Clauses 1-63.

Clause 66: A non-transitory computer-readable medium comprising computer-executable instructions that, when executed by one or more processors of a processing system, cause the processing system to perform a method in accordance with any one of Clauses 1-63.

Clause 67: A computer program product embodied on a computer-readable storage medium comprising code for performing a method in accordance with any one of Clauses 1-63.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmW), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with core network 190 through second backhaul links 184. BSs 102 may communicate directly or indirectly (e.g., through the EPC 160 or core network 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as gNB 180 may operate in a traditional sub-6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station.

The communication links 120 between BSs 102 and, for example, UEs 104, may be through one or more carriers. For example, BSs 102 and UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communication network 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and may be responsible for session management (start/stop) and for collecting eMBMS related charging information.

Core network 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and core network 190. Generally, AMF 192 provides QoS flow and session management.

All user Internet protocol (IP) packets are transferred through UPF 195, which is connected to the IP Services 197, and which provides UE IP address allocation as well as other functions for core network 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 104, antennas 252a-252r may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM, etc.) to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM, etc.), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

Antennas 252, processors 266, 258, 264, and/or controller/processor 280 of UE 104 and/or antennas 234, processors 220, 230, 238, and/or controller/processor 240 of BS 102 may be used to perform the various techniques and methods described herein.

For example, as shown in FIG. 2, the controller/processor 240 of the BS 102 has a paging early indication (PEI) component 241 that may be configured to perform the operations in one or more of FIGS. 6, 9, and 11, as well as other operations described herein for paging based on a PEI. As shown in FIG. 2, the controller/processor 280 of the UE 104 has a PEI component 281 that may be configured to perform the operations in one or more of FIGS. 5, 8, 10, and 12, as well as other operations described herein for paging based on a PEI. Although shown at the controller/processor, other components of UE 104 and BS 102 may be used to perform the operations described herein.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

As above, FIGS. 3A-3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^\mu \times 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 3A-3D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

ADDITIONAL CONSIDERATIONS

The preceding description provides examples of paging based on a paging early indication (PEI) in communication systems. Changes may be made in the function and arrangement of elements discussed without departing from the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another. In other words, unless a specific order of steps or actions is specified, the order and/or use of specific steps and/or actions may be modified.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

Reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, a digital signal processor (DSP), an application specific integrated circuit (ASIC), or a processor (e.g., a general purpose or specifically programmed processor).

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (see FIG. 1), a user interface (e.g., keypad, display, mouse, joystick, touchscreen, biometric sensor, proximity sensor, light emitting element, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above can also be considered as examples of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIGS. 5, 6, and 8-12.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated herein. Various modifications, changes and variations may be made in the arrangement, operation, and details of the methods and apparatus described herein.

The invention claimed is:

1. A method for wireless communication by a user equipment (UE), comprising:
   determining a set of paging cycles for receiving paging information;
   receiving configuration information indicating how to interpret a paging early indicator (PEI) to determine whether to receive a paging physical downlink control channel (PDCCH) after the PEI is received, wherein the configuration information is received in a radio resource control (RRC) release message;
   receiving the PEI, wherein:
   the PEI provides an implicit indication to receive the paging PDCCH based on the configuration information; and
   the PEI includes:
      an indication to the UE whether the paging information will be transmitted in one or more paging cycles of the set of paging cycles; and
      additional information related to receiving the paging information, wherein the additional information comprises:
         a short message in the PEI; and
         a short message indicator, separate from the short message, indicating whether the UE should receive the paging information in the one or more paging cycles;
   determining to receive the paging PDCCH based on the implicit indication provided by the PEI and the configuration information;
   receiving the paging PDCCH based on the determination to receive the paging PDCCH, wherein the paging PDCCH also indicates whether the paging information will be transmitted in one or more paging cycles of the set of paging cycles;
   receiving, based on the PEI, at least one of a first number of a number of synchronization signal block (SSB) bursts or a second number of reference signal (RS) occasions, wherein at least one of the first number of SSB bursts or the second number of RS occasions is based on downlink channel conditions associated with the UE; and
   receiving, after receiving the first number of SSB burst or the second number of RS occasions, the paging information in the one or more paging cycles indicated by the PEI and the paging PDCCH, wherein:
      receiving the paging information is based on a paging starting configuration associated with the PEI; and
      the paging starting configuration indicates a plurality of consecutive paging cycles, of the set of paging cycles, in which to receive the paging information, the plurality of consecutive paging cycles starting from a paging cycle in which the PEI is received.

2. The method of claim 1, wherein:
   the additional information related to receiving the paging information includes an indication of a cycle length of the one or more paging cycles to receive the paging information; and
   receiving the paging information is based on the indication of the cycle length.

3. The method of claim 1, wherein the additional information related to receiving the paging information comprises a flag that indicates one paging cycle of a defined group of paging cycles for receiving the paging information.

4. The method of claim 3, further comprising receiving signaling including configuration information configuring the defined group of paging cycles.

5. The method of claim 4, wherein the signaling including the configuration information configuring the defined group of paging cycles is received in at least one of a system information block (SIB) or a radio resource control (RRC) release message.

6. The method of claim 3, wherein receiving the paging information in the one or more paging cycles comprises receiving the paging information in the one paging cycle of the defined group of paging cycles indicated by the flag.

7. The method of claim 1, wherein the short message comprises an indication of whether the UE should receive updated system information or an Earthquake and Tsunami Warning System (ETWS) message.

8. The method of claim 1, wherein at least one of the first number of SSB bursts or the second number of RS occasions depends on a number of receive antennas of the UE and on a type of channel over which the paging information is received.

9. The method of claim 1, wherein the paging starting configuration is received in the RRC release message.

10. The method of claim 1, wherein:

the additional information includes one or more bits indicating an increase or decrease in a length of the one or more paging cycles relative to a current paging cycle length; and receiving the paging information in the one or more paging cycles is based on the increased or decreased length of the one or more paging cycles.

11. A user equipment (UE), comprising:
one or more memories comprising executable instructions; and
one or more processors configured to execute the executable instructions and cause the UE to:
  determine a set of paging cycles for receiving paging information;
  receive configuration information indicating how to interpret a paging early indicator (PEI) to determine whether to receive a paging physical downlink control channel PDCCH) after the PEI is received, wherein the configuration information is received in a radio resource control (RRC) release message;
  receive the PEI, wherein:
    the PEI provides an implicit indication to receive the paging PDCCH based on the configuration information; and
    the PEI includes:
      an indication to the UE whether the paging information will be transmitted in one or more paging cycles of the set of paging cycles; and
      additional information related to receiving the paging information,
    wherein the additional information comprises:
      a short message in the PEI; and
      a short message indicator, separate from the short message, indicating whether the UE should receive the paging information in the one or more paging cycles;
  determine to receive the paging PDCCH based on the implicit indication provided by the PEI and the configuration information;
  receive the paging PDCCH based on the determination to receive the paging PDCCH, wherein the paging PDCCH also indicates whether the paging information will be transmitted in one or more paging cycles of the set of paging cycles;
  receive, based on the PEI, at least one of a first number of a number of synchronization signal block (SSB) bursts or a second number of reference signal (RS) occasions, wherein at least one of the first number of SSB bursts or the second number of RS occasions is based on downlink channel conditions associated with the UE; and
  receive, after receiving the first number of SSB burst or the second number of RS occasions, the paging information in the one or more paging cycles indicated by the PEI and the paging PDCCH, wherein:
    the one or more processors are configured to cause the UE to receive the paging information based on a paging starting configuration associated with the PEI; and
    the paging starting configuration indicates a plurality of consecutive paging cycles, of the set of paging cycles, in which to receive the paging information, the plurality of consecutive paging cycles starting from a paging cycle in which the PEI is received.

12. The UE of claim 11, wherein:
the additional information related to receiving the paging information includes an indication of a cycle length of the one or more paging cycles to receive the paging information; and
the one or more processors are further configured to cause the UE to receive the paging information based on the indication of the cycle length.

13. The UE of claim 11, wherein the additional information related to receiving the paging information comprises a flag that indicates one paging cycle of a defined group of paging cycles for receiving the paging information.

14. The UE of claim 13, the one or more processors are further configured to cause the UE to receive signaling including configuration information configuring the defined group of paging cycles.

15. The UE of claim 14, wherein the signaling including the configuration information configuring the defined group of paging cycles is received in at least one of a system information block (SIB) or a radio resource control (RRC) release message.

16. The UE of claim 13, wherein, in order to receive the paging information in the one or more paging cycles, the one or more processors are further configured to cause the UE to receive the paging information in the one paging cycle of the defined group of paging cycles indicated by the flag.

17. The UE of claim 11, wherein the short message comprises an indication of whether the UE should receive updated system information or an Earthquake and Tsunami Warning System (ETWS) message.

* * * * *